(12) United States Patent
Zhang et al.

(10) Patent No.: US 11,960,062 B2
(45) Date of Patent: Apr. 16, 2024

(54) OPTICAL IMAGING LENS

(71) Applicant: ZHEJIANG SUNNY OPTICS CO., LTD., Yuyao (CN)

(72) Inventors: Shuang Zhang, Yuyao (CN); Xiaobin Zhang, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 705 days.

(21) Appl. No.: 17/142,684

(22) Filed: Jan. 6, 2021

(65) Prior Publication Data

US 2021/0263283 A1  Aug. 26, 2021

(30) Foreign Application Priority Data

Feb. 24, 2020  (CN) .......................... 202010128141.7

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ....... G02B 13/0045; G02B 9/62; G02B 13/18
USPC .......................................... 359/713, 756, 759
See application file for complete search history.

(56) References Cited

U.S. PATENT DOCUMENTS 10,627,603 B2 * 4/2020 Huang ..................... G02B 9/62
2015/0029599 A1 * 1/2015 Huang ..................... G02B 9/62
                                                                    359/713

* cited by examiner

*Primary Examiner* — Thomas K Pham
*Assistant Examiner* — Jennifer A Jones
(74) *Attorney, Agent, or Firm* — Birch, Stewart, Kolasch & Birch, LLP

(57) ABSTRACT

The present application discloses an optical imaging lens, comprising, in order from an object side to an image side along an optical axis: a first lens having a positive refractive power; a second lens having a positive refractive power; a third lens having a negative refractive power; a fourth lens; a fifth lens having a negative refractive power; and a sixth lens having a positive refractive power, wherein a distance TTL from an object side surface of the first lens to an imaging plane of the optical imaging lens on the optical axis and an entrance pupil diameter EPD of the optical imaging lens satisfy TTL/EPD<1.9; and a total effective focal length f of the optical imaging lens satisfies 6.0 mm<f<7.5 mm.

18 Claims, 9 Drawing Sheets

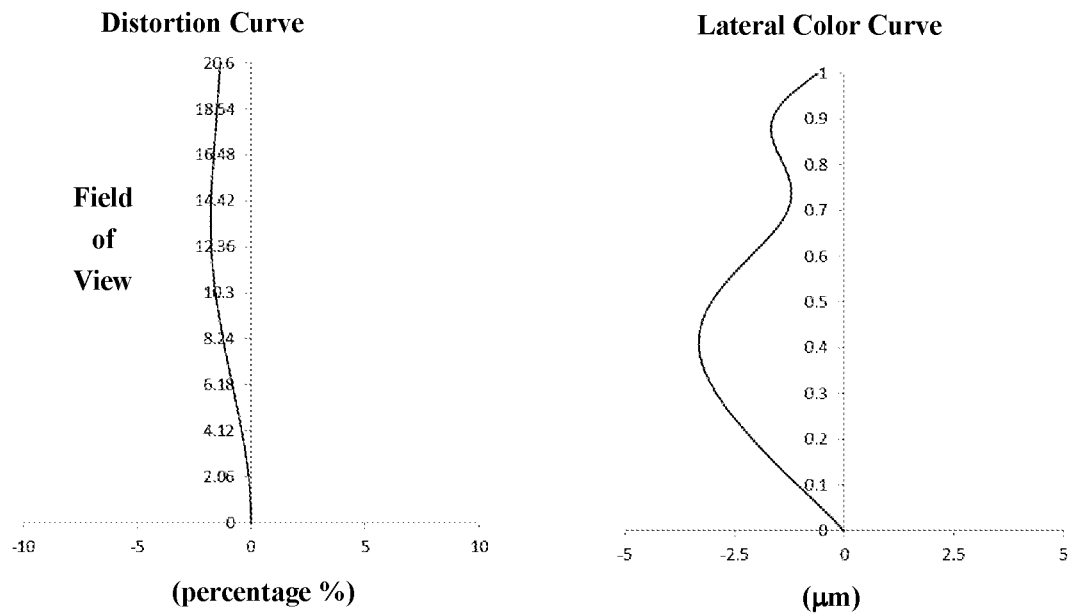
Fig. 10C
Fig. 10D
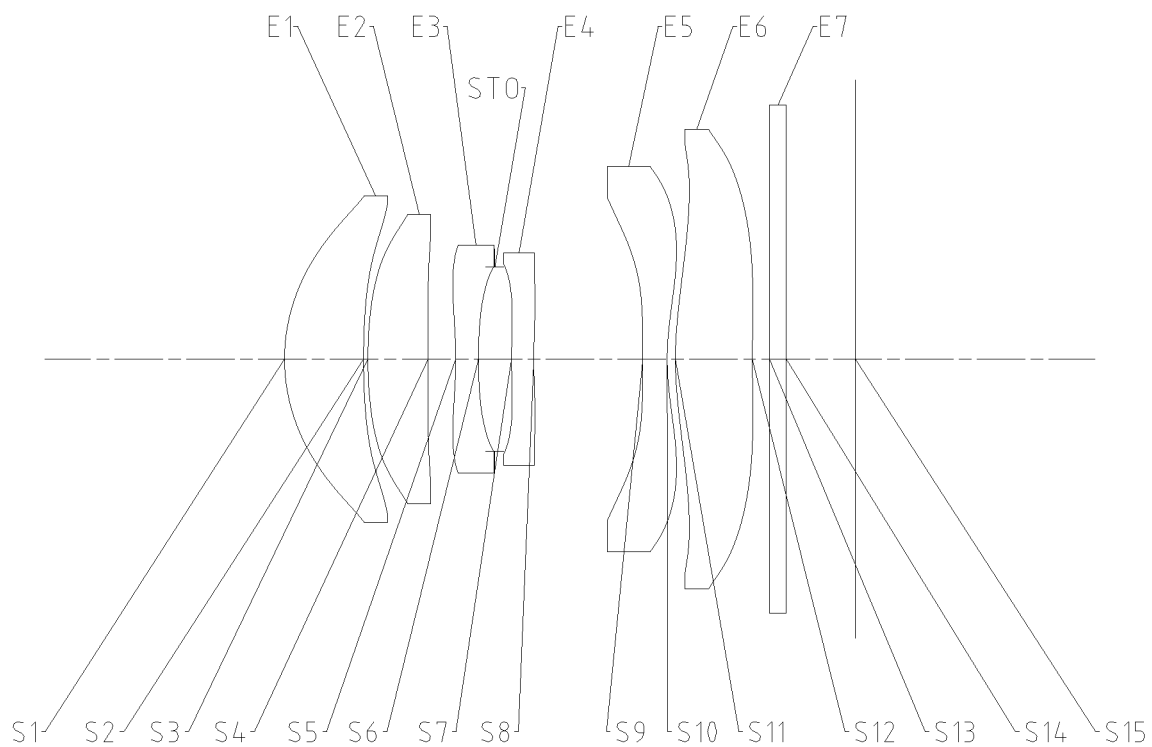
Fig. 11

OPTICAL IMAGING LENS

CROSS-REFERENCE TO RELATED APPLICATIONS

The present application claims the priority of Chinese patent application No. 202010128141.7, filed on Feb. 24, 2020, which is hereby incorporated by reference in its entirety.

TECHNICAL FIELD

The present application relates to the field of optical elements, and more specifically, to an optical imaging lens.

TECHNICAL BACKGROUND

Portable devices such as mobile phones are usually equipped with camera modules, so that the mobile phones have a camera function. In recent years, with the rapid rise of mobile network social platforms mounted in the mobile phones, people often share their daily lives through social platforms. For example, the attention of others is desired to be more captured through high-style pictures of people, scenery, and food. Therefore, people's needs for camera lenses are becoming more and more diverse.

In order to meet the needs of consumers, the mobile phone industry usually designs camera modules equipped with various optical imaging lenses having different functions for different capturing effects such as close-up, long-distance and capturing videos. The camera module is usually provided with a charge-coupled-device (CCD) type image sensor or a complementary-metal-oxide-semiconductor (CMOS) type image sensor, and is provided with an optical imaging lens. The optical imaging lens can collect light from the object side, so that imaging light travels along the optical path of the optical imaging lens and is irradiated onto the image sensor. Then, the image sensor converts light signals into electrical signals to form image data.

In order to meet the imaging requirements, an optical imaging lens that can have both a long focal length and a large aperture is needed.

SUMMARY

The present application provides an optical imaging lens suitable for portable electronic products, which can at least or partially solve at least one of the above-mentioned shortcomings in the prior art.

In one aspect, the present application provides an optical imaging lens, comprising, in order from an object side to an image side along an optical axis: a first lens having a positive refractive power; a second lens having a positive refractive power; a third lens having a negative refractive power; a fourth lens; a fifth lens having a negative refractive power; and a sixth lens having a positive refractive power, wherein a distance TTL from an object side surface of the first lens to an imaging plane of the optical imaging lens on the optical axis and an entrance pupil diameter EPD of the optical imaging lens may satisfy TTL/EPD<1.9; and a total effective focal length f of the optical imaging lens may satisfy 6.0 mm<f<7.5 mm.

In one implementation, there is at least one aspherical lens surface from an object side surface of the first lens to an image side surface of the sixth lens.

In one implementation, an effective focal length f1 of the first lens, an effective focal length f2 of the second lens, and an effective focal length f6 of the sixth lens may satisfy 0.5<(f1+f2)/f6<1.9.

In one implementation, an effective focal length f3 of the third lens and an effective focal length f5 of the fifth lens may satisfy 0.4<f3/f5<0.9.

In one implementation, a radius of curvature R2 of an image side surface of the first lens and a radius of curvature R1 of the object side surface of the first lens may satisfy 4.3<R2/R1<4.8.

In one implementation, a radius of curvature R6 of an image side surface of the third lens and a radius of curvature R3 of an object side surface of the second lens may satisfy 0.4<R6/R3<1.2.

In one implementation, the total effective focal length f of the optical imaging lens and the entrance pupil diameter EPD of the optical imaging lens may satisfy f/EPD<2.0.

In one implementation, the distance TTL from the object side surface of the first lens to the imaging plane of the optical imaging lens on the optical axis and the total effective focal length f of the optical imaging lens may satisfy TTL/f<1.0.

In one implementation, the maximum field of view FOV of the optical imaging lens may satisfy 41°<FOV<51°.

In one implementation, the optical imaging lens further comprises a diaphragm on the optical axis; and a distance SL from the diaphragm to the imaging plane of the optical imaging lens on the optical axis and the distance TTL from the object side surface of the first lens to the imaging plane of the optical imaging lens on the optical axis may satisfy 0.6<SL/TTL<0.7.

In one implementation, a combined focal length f56 of the fifth lens and the sixth lens and a combined focal length f34 of the third lens and the fourth lens may satisfy 2.6<f56/f34<3.8.

In one implementation, a combined focal length f12 of the first lens and the second lens, a center thickness CT1 of the first lens on the optical axis and a center thickness CT2 of the second lens on the optical axis may satisfy 1.8<f12/(CT1+CT2)<2.2.

In one implementation, an on-axis distance SAG51 between an intersection point of an object side surface of the fifth lens and the optical axis and an effective radius vertex of the object side surface of the fifth lens, an on-axis distance SAG52 between an intersection point of an image side surface of the fifth lens and the optical axis and an effective radius vertex of the image side surface of the fifth lens, an on-axis distance SAG61 between an intersection point of an object side surface of the sixth lens and the optical axis and an effective radius vertex of the object side surface of the sixth lens, and an on-axis distance SAG62 between an intersection point of an image side surface of the sixth lens and the optical axis and an effective radius vertex of the image side surface of the sixth lens may satisfy 1.0<(SAG51+SAG52)/(SAG61+SAG62)<2.3.

In a second aspect, the present application provides an optical imaging lens, comprising, in order from an object side to an image side along an optical axis: a first lens having a positive refractive power; a second lens having a positive refractive power; a third lens having a negative refractive power; a fourth lens; a fifth lens having a negative refractive power; and a sixth lens having a positive refractive power, wherein a total effective focal length f of the optical imaging lens and an entrance pupil diameter EPD of the optical imaging lens satisfy f/EPD<2.0; and the total effective focal length f of the optical imaging lens satisfies 6.0 mm<f<7.5 mm.

In the present application, six lenses are adopted. The refractive power, surface shape and center thickness of each lens, the on-axis distances between the respective lenses, and the like are reasonably distributed, so that the above-mentioned optical imaging lens has at least one beneficial effect of long focal length, large aperture, high image quality, high resolution and so on.

BRIEF DESCRIPTION OF THE DRAWINGS

Other features, objectives and advantages of the present application will become more apparent from the following detailed description of non-limiting implementations in conjunction with the drawings. In the drawings:

FIGS. 10A to 10D show a longitudinal aberration curve, astigmatism curve, distortion curve and lateral color curve of the optical imaging lens according to Embodiment 5, respectively;

FIG. 11 shows a schematic structural diagram of an optical imaging lens according to Embodiment 6 of the present application.

DETAILED DESCRIPTION OF THE EMBODIMENTS

Figure 1:
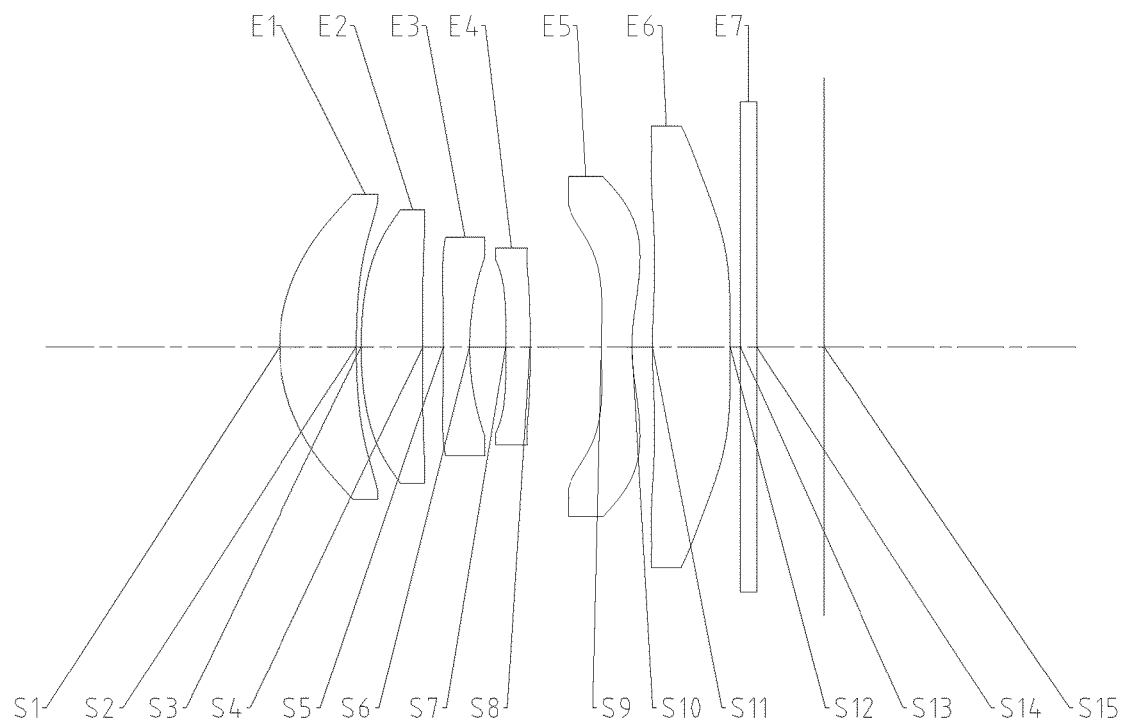
FIG. 1 shows a schematic structural diagram of an optical imaging lens according to Embodiment 1 of the present application.

In order to better understand the present application, various aspects of the present application will be described in more detail with reference to the drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspherical surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to an object to be captured is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears after the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

An optical imaging lens according to an exemplary implementation of the present application may include, for example, six lenses having refractive powers, i.e., a first lens, a second lens, a third lens, a fourth lens, a fifth lens and a sixth lens. The six lenses are arranged in order from an object side to an image side along an optical axis. In the first to sixth lenses, there may be an air gap between any two adjacent lenses.

In an exemplary implementation, the optical imaging lens described above may further include at least one diaphragm. The diaphragm may be disposed at an appropriate position along the optical axis as needed. For example, it is disposed between the third lens and the fourth lens. Optionally, the optical imaging lens described above may further include a filter for correcting color deviation and/or a protective glass for protecting a photosensitive element located on an imaging plane.

In an exemplary implementation, the first lens may have a positive refractive power, and the second lens may have a positive refractive power. The first lens having the positive refractive power and the second lens having the positive refractive power have a good converging effect on imaging light of the optical imaging lens. For example, the third lens may have a negative refractive power. The third lens having a negative refractive power can be helpful to increase the focal length of the optical imaging lens while better eliminating the aberration of the optical imaging lens. For example, the fifth lens may have a negative refractive power. The fifth lens having the negative refractive power is helpful to further increase the focal length of the optical imaging lens, reduce the size of the optical imaging lens and ensure that the imaging light is transmitted smoothly in the optical imaging lens. For example, the sixth lens may have a positive refractive power. The sixth lens having the positive refractive power can further enhance the convergence action of light, and reduce astigmatism and coma aberrations of the optical imaging lens while ensuring that the optical imaging lens has telephoto properties, so that the imaging lens imaging light has a good convergence effect on the imaging light. The fourth lens has a positive or negative refractive power. The balance correction of aberrations in the optical imaging lens can be realized by integrating the fourth lens, so that the images captured by the optical imaging lens have a good distance compression effect while improving the image quality of the captured images.

In an exemplary implementation, the optical imaging lens of the present application may satisfy a conditional expression of TTL/EPD<1.9, where TTL is a distance from an object side surface of the first lens to the imaging plane of the optical imaging lens on the optical axis, and EPD is an entrance pupil diameter of the optical imaging lens. The ratio of the total optical length to the entrance pupil diameter of the optical imaging lens is controlled, which is advantageous to make the optical imaging lens have the characteristic of large aperture. More specifically, TTL and EPD may satisfy $1.7<TTL/EPD<1.9$.

In an exemplary implementation, the optical imaging lens of the present application may satisfy a conditional expression of 6.0 mm<f<7.5 mm, where f is a total effective focal length of the optical imaging lens. Such an arrangement may allow the optical imaging lens to have the telephoto properties, which can be used to achieve capturing of distant views. More specifically, f may satisfy 6.0 mm<f<7.5 mm. For example, the optical imaging lens of the present application also satisfies a conditional expression of TTL/EPD<1.9. The optical imaging lens has telephoto properties, and at the same time, the imaging lens has the characteristic of large aperture. It can increase the light flux of the optical imaging lens and improve the resolution of the optical imaging lens while capturing a distant view, and further enhance the capturing effect of the optical imaging lens to present a better image of the distant view.

In an exemplary implementation, the optical imaging lens of the present application may satisfy a conditional expression of $0.5<(f1+f2)/f6<1.9$, where f1 is an effective focal length of the first lens, f2 is an effective focal length of the second lens, and f6 is an effective focal length of the sixth lens. The effective focal lengths of the three lenses are matched, which is advantageous for the reasonable distribution of the refractive power of the optical imaging lens so that the optical imaging lens has a balanced structure, ensuring smooth transmission of light, and facilitating achromatic aberration and avoiding stray light.

In an exemplary implementation, the optical imaging lens of the present application may satisfy a conditional expression of $0.4<f3/f5<0.9$, where f3 is an effective focal length of the third lens, and f5 is an effective focal length of the fifth lens. The ratio of the effective focal lengths of the two lenses is controlled, which is helpful to balance the refractive power of the third lens and the refractive power of the fifth lens, effectively reduce the sensitivity of the third lens, and at the same time, optimize the surface shape of the fifth lens. More specifically, f3 and f5 may satisfy $0.49<f3/f5<0.81$.

In an exemplary implementation, the optical imaging lens of the present application may satisfy a conditional expression of $4.3<R2/R1<4.8$, where R2 is a radius of curvature of the image side surface of the first lens, and R1 is a radius of curvature of the object side surface of the first lens. The ratio of the radii of curvature of two surfaces of the first lens is controlled to be in the range, which is helpful to increase the telephoto field of view of the optical imaging lens, and increase the capturing space. More specifically, R2 and R1 may satisfy $4.40<R2/R1<4.71$.

In an exemplary implementation, the optical imaging lens of the present application may satisfy a conditional expression of $0.4<R6/R3<1.2$, where R6 is a radius of curvature of an image side surface of the third lens, and R3 is a radius of curvature of an object side surface of the second lens. The ratio of the radii of curvature of the image side surface of the third lens and the object side surface of the second lens is controlled, which is helpful to constrain the shapes of the second lens and the third lens, thereby helping to reduce the chromatic spherical aberration of the optical imaging lens. More specifically, R6 and R3 may satisfy $0.42<R6/R3<1.11$.

In an exemplary implementation, the optical imaging lens of the present application may satisfy a conditional expression of f/EPD<2.0, where f is the total effective focal length of the optical imaging lens, and EPD is the entrance pupil diameter of the optical imaging lens. Controlling this expression is advantageous to increase the aperture of the optical imaging lens, thereby increasing the effective clear aperture of the optical imaging lens, enhancing the exposure, and improving the relative illumination of the optical imaging lens. More specifically, f and EPD may satisfy $1.8<f/EPD<2.0$.

In an exemplary implementation, the optical imaging lens of the present application may satisfy a conditional expression of TTL/f<1.0. Controlling the conditional expression is advantageous for the optical imaging lens to capture a scene and object at a longer distance and present fine imaging details. More specifically, TTL and f may satisfy $0.9<TTL/f<1.0$.

In an exemplary implementation, the optical imaging lens of the present application may satisfy a conditional expression of $41°<FOV<51°$, where FOV is the maximum field of view of the optical imaging lens. Limiting the maximum field of view is helpful for the optical imaging lens to have a larger imaging space while capturing a scene and object at a longer distance, thereby presenting a richer scene image.

In an exemplary implementation, the optical imaging lens further includes a diaphragm disposed on the optical axis, and the optical imaging lens of the present application may satisfy a conditional expression of 0.6<SL/TTL<0.7, where SL is a distance from the diaphragm to the imaging plane of the optical imaging lens on the optical axis, and TTL is the distance from the object side surface of the first lens to the imaging plane of the optical imaging lens on the optical axis. Controlling the ratio of the on-axis distance from the diaphragm to the imaging plane and the total optical length can effectively control the position of the diaphragm, which is helpful to improve the illumination and resolution of the optical imaging lens. In addition, stray light generated by the first lens and the object-side end surface of the lens barrel for mounting the lens can be avoided.

In an exemplary implementation, the optical imaging lens of the present application may satisfy a conditional expression of 2.6<f56/f34<3.8, where f56 is a combined focal length of the fifth lens and the sixth lens, and f34 is a combined focal length of the third lens and the fourth lens. Controlling the range of the conditional expression may allow the imaging light to be smoothly transmitted in the optical imaging lens, and at the same time, the optical imaging lens has a structure similar to a double Gauss structure, which is helpful for the optical imaging lens to eliminate aberrations, further improving the resolution of the optical imaging lens. More specifically, f56 and f34 may satisfy 2.65<f56/f34<3.75.

In an exemplary implementation, the optical imaging lens of the present application may satisfy a conditional expression of 1.8<f12/(CT1+CT2)<2.2, where f12 is a combined focal length of the first lens and the second lens, CT1 is a center thickness of the first lens on the optical axis, and CT2 is a center thickness of the second lens on the optical axis. Controlling the conditional expression is advantageous to control the shape of the first lens and the shape of the second lens so as to reduce the sensitivity of the two lenses while facilitating the processing of the two lenses. More specifically, f12, CT1 and CT2 may satisfy 1.9<f12/(CT1+CT2)<2.1.

In an exemplary implementation, the optical imaging lens of the present application may satisfy a conditional expression of 1.0<(SAG51+SAG52)/(SAG61+SAG62)<2.3, where SAG51 is an on-axis distance between an intersection point of an object side surface of the fifth lens and the optical axis and an effective radius vertex of the object side surface of the fifth lens, SAG52 is an on-axis distance between an intersection point of an image side surface of the fifth lens and the optical axis and an effective radius vertex of the image side surface of the fifth lens, SAG61 is an on-axis distance between an intersection point of an object side surface of the sixth lens and the optical axis and an effective radius vertex of the object side surface of the sixth lens, and SAG62 is an on-axis distance between an intersection point of an image side surface of the sixth lens and the optical axis and an effective radius vertex of the image side surface of the sixth lens. The vector heights of the four lens surfaces are matched, which can effectively reduce the degree of bending of the fifth lens and the degree of bending of the sixth lens, thereby facilitating the machining of the two lenses. Further, it is also helpful to eliminate ghosting generated by the fifth lens.

The optical imaging lens according to the above-mentioned implementations of the present application may adopt multiple lenses, for example, the above-mentioned six lenses. The refractive power, surface shape and center thickness of each lens, the on-axis distances between the respective lenses, and the like are reasonably distributed, which can effectively reduce the volume of the imaging lens, reduce the sensitivity of the imaging lens, and improve the machinability of the imaging lens, so that the optical imaging lens is more advantageous for production and machining and is applicable for portable electronic products. At the same time, the optical imaging lens of the present application also has excellent optical performance such as long focal length, large aperture, high image quality, and high resolution.

In the implementations of the present application, at least one of lens surfaces of the respective lens is an aspherical lens surface, that is, at least one of the surfaces from the object side surface of the first lens to the image side surface of the sixth lens is an aspherical lens surface. An aspherical lens is characterized in that the curvature changes continuously from the center of the lens to the periphery of the lens. Unlike a spherical lens having a constant curvature from the center of the lens to the periphery of the lens, the aspherical lens has better radius-of-curvature properties, and has the advantages of improving distortion aberration and improving astigmatism aberration. After the aspherical lens is adopted, the aberrations that occur during imaging can be eliminated as much as possible, thereby improving the imaging quality. Optionally, at least one of an object side surface and an image side surface of each lens among the first lens, the second lens, the third lens, the fourth lens, the fifth lens, and the sixth lens is an aspherical lens surface. Optionally, both an object side surface and an image side surface of each lens among the first lens, the second lens, the third lens, the fourth lens, the fifth lens, and the sixth lens are aspherical lens surfaces.

However, it should be understood by those skilled in the art that the number of lenses constituting the optical imaging lens can be changed without departing from the technical solution claimed in the present application, to obtain respective results and advantages described in the description. For example, although six lenses have been described in the implementations as an example, the optical imaging lens is not limited to including the six lenses. If necessary, the optical imaging lens may also include other numbers of lenses.

Specific embodiments of the optical imaging lens applicable to the above-mentioned implementations will be further described below with reference to the drawings.

Embodiment 1

An optical imaging lens according to Embodiment 1 of the present application will be described below with reference to FIGS. 1 to 2D. FIG. 1 shows a schematic structural diagram of the optical imaging lens according to Embodiment 1 of the present application.

As shown in FIG. 1, the optical imaging lens includes in order from an object side to an image side along an optical axis: a first lens E1, a second lens E2, a third lens E3, a fourth lens E4, a fifth lens E5, a sixth lens E6 and a filter E7.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a concave image side surface S12. The filter E7 has an object side surface S13 and an image side surface S14. The optical imaging lens has an imaging plane S15, and light from an object passes through the respective surfaces S1 to S14 in order and finally forms an image on the imaging plane S15.

Table 1 shows a table of basic parameters of the optical imaging lens of Embodiment 1, wherein the units of the radius of curvature, thickness/distance, and focal length are all millimeters (mm).

TABLE 1

| Surface No. | Surface type | Radius of curvature | Thickness/ Distance | Refractive index | Abbe number | Focal length | Conic coefficient |
|---|---|---|---|---|---|---|---|
| OBJ | Spherical | Infinity | Infinity | | | | |
| S1 | Aspherical | 2.2616 | 0.9904 | 1.55 | 56.1 | 5.09 | 0.0402 |
| S2 | Aspherical | 10.3150 | 0.0620 | | | | 24.3704 |
| S3 | Aspherical | 5.5406 | 0.7940 | 1.55 | 56.1 | 10.00 | 7.6796 |
| S4 | Aspherical | −361.5059 | 0.2635 | | | | −99.0000 |
| S5 | Aspherical | −24.5595 | 0.3350 | 1.67 | 20.4 | −4.54 | −65.5536 |
| S6 (STO) | Aspherical | 3.4646 | 0.4630 | | | | 0.0000 |
| S7 | Aspherical | 117.2277 | 0.3121 | 1.68 | 19.2 | 115.26 | 0.0000 |
| S8 | Aspherical | −233.7332 | 0.9226 | | | | 0.0000 |
| S9 | Aspherical | 10.2922 | 0.3920 | 1.55 | 56.1 | −6.43 | −16.3650 |
| S10 | Aspherical | 2.5815 | 0.2623 | | | | −0.2800 |
| S11 | Aspherical | 7.3236 | 0.9974 | 1.68 | 19.2 | 12.16 | −10.3253 |
| S12 | Aspherical | 62.3275 | 0.1300 | | | | 0.0000 |
| S13 | Spherical | Infinity | 0.2100 | 1.52 | 64.2 | | |
| S14 | Spherical | Infinity | 0.8654 | | | | |
| S15 | Spherical | Infinity | | | | | |

In Embodiment 1, a value of a total effective focal length f of the optical imaging lens is 7.20 mm, a value of an on-axis distance TTL from the object side surface S1 of the first lens E1 to the imaging plane S15 is 7.00 mm, and a value of ImgH that is half of a diagonal length of an effective pixel region on the imaging plane S15 is 3.47 mm.

In Embodiment 1, both the object side surface and image side surface of any one of the first lens E1 to the sixth lens E6 are aspherical, and the surface shape x of each aspherical lens can be defined by using but not limited to the following aspherical formula:

$$x = \frac{ch^2}{1 + \sqrt{1 - (k+1)c^2h^2}} + \sum A_i h^i \qquad (1)$$

where x is a distance vector height from a vertex of the aspherical surface when the aspherical surface is at a height of h along the optical axis direction; c is paraxial curvature of the aspherical surface, c=1/R (that is, the paraxial curvature c is the reciprocal of the radius of curvature R in Table 1 above); k is a conic coefficient; and Ai is a correction coefficient of an i-th order of the aspherical surface. High-order coefficients $A_4, A_6, A_8, A_{10}, A_{12}, A_{14}, A_{16}, A_{18}$ and $A_{20}$ of each aspherical lens surface of S1 to S12 that are applicable in Embodiment 1 are given in Table 2 below.

TABLE 2

| Surface No. | A4 | A6 | A8 | A10 | A12 | A14 | A16 | A18 | A20 |
|---|---|---|---|---|---|---|---|---|---|
| S1 | −3.7862E−03 | −6.6618E−04 | −3.1332E−04 | 5.0998E−05 | −1.7881E−05 | −6.7514E−06 | 1.6051E−06 | −2.2137E−07 | 0.0000E+00 |
| S2 | 1.7206E−02 | −1.2386E−02 | 1.5233E−02 | −1.1387E−02 | 4.8719E−03 | −1.2535E−03 | 1.7743E−04 | −1.0626E−05 | 0.0000E+00 |
| S3 | 1.7924E−02 | −1.3506E−02 | 2.1612E−02 | −1.8301E−02 | 9.2987E−03 | −2.9365E−03 | 5.3570E−04 | −4.4810E−05 | 0.0000E+00 |
| S4 | −5.1419E−03 | 1.3280E−02 | −4.7126E−03 | −1.8673E−03 | 2.3960E−03 | −8.5172E−04 | 1.0094E−04 | 0.0000E+00 | 0.0000E+00 |
| S5 | −1.7278E−02 | 5.7334E−02 | −5.4480E−02 | 3.1027E−02 | −9.3024E−03 | 1.1696E−03 | 0.0000E+00 | 0.0000E+00 | 0.0000E+00 |

TABLE 2-continued

| Surface No. | A4 | A6 | A8 | A10 | A12 | A14 | A16 | A18 | A20 |
|---|---|---|---|---|---|---|---|---|---|
| S6 | −2.8871E−02 | 5.7898E−02 | −4.8873E−02 | 1.0318E−02 | 1.3431E−02 | −7.4719E−03 | 0.0000E+00 | 0.0000E+00 | 0.0000E+00 |
| S7 | −8.3660E−02 | 4.4231E−03 | 2.7562E−02 | −1.5082E−01 | 3.1211E−01 | −3.3876E−01 | 1.9133E−01 | −4.4917E−02 | 0.0000E+00 |
| S8 | −4.9202E−02 | 1.9561E−02 | −1.4728E−02 | 2.1511E−02 | −1.8470E−02 | 1.8927E−02 | −1.3460E−02 | 5.4560E−03 | −9.9347E−04 |
| S9 | −1.0836E−01 | 3.8701E−02 | −2.5305E−02 | 1.5488E−02 | −7.3235E−03 | 1.8697E−03 | 6.7149E−06 | −8.8681E−05 | 1.0921E−05 |
| S10 | −1.4411E−01 | 7.1710E−02 | −3.9495E−02 | 1.6282E−02 | −4.9030E−03 | 9.8812E−04 | −1.1522E−04 | 5.7914E−06 | 0.0000E+00 |
| S11 | −5.2420E−02 | 2.2947E−02 | −6.9290E−03 | 1.2193E−03 | −2.2398E−05 | −3.7202E−05 | 7.6741E−06 | −6.6449E−07 | 2.2288E−08 |
| S12 | −4.2128E−02 | 9.8340E−03 | −1.8605E−03 | −4.6320E−05 | 2.2558E−04 | −7.4142E−05 | 1.1165E−05 | −8.2771E−07 | 2.4450E−08 |

Figure 2A:
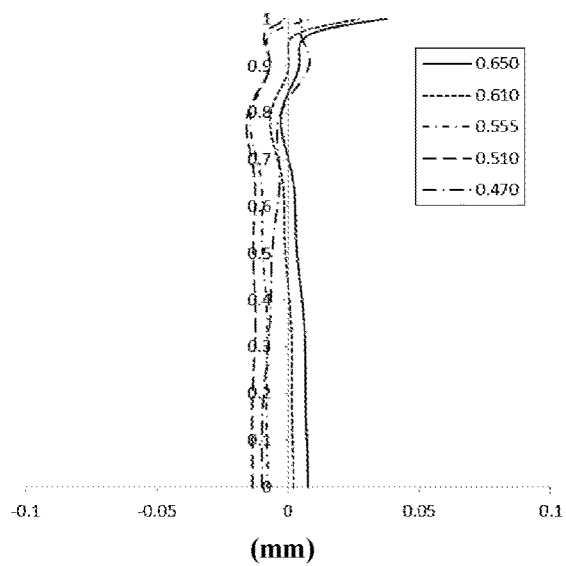
FIGS. 2A to 2D show a longitudinal aberration curve, astigmatism curve, distortion curve and lateral color curve of the optical imaging lens according to Embodiment 1, respectively.
Figure 2B:
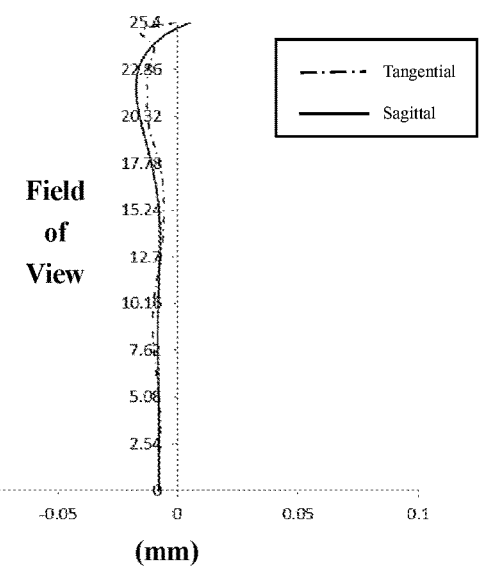
Figure 2C:
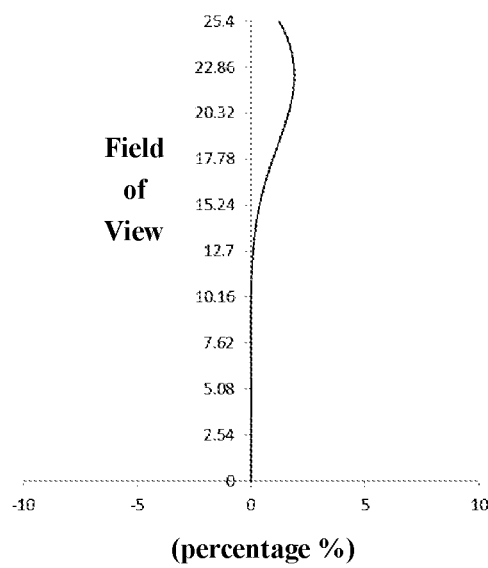
Figure 2D:
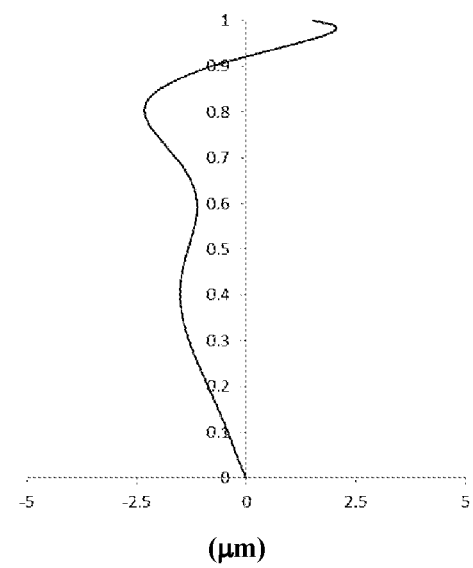

FIG. 2A shows a longitudinal aberration curve of the optical imaging lens according to Embodiment 1, which represents the deviation of the converged focal point after light of different wavelengths passes through the camera lens. FIG. 2B shows an astigmatism curve of the optical imaging lens according to Embodiment 1, which represents the curvature of the tangential image plane and the curvature of the sagittal image plane. FIG. 2C shows a distortion curve of the optical imaging lens according to Embodiment 1, which represents distortion magnitude values corresponding to different fields of view. FIG. 2D shows a lateral color curve of the optical imaging lens according to Embodiment 1, which represents the deviation of different image heights on the imaging plane after light passes through the camera lens. According to FIGS. 2A to 2D, it can be seen that the optical imaging lens given in Embodiment 1 can realize good quality of imaging.

Embodiment 2

Figure 3:
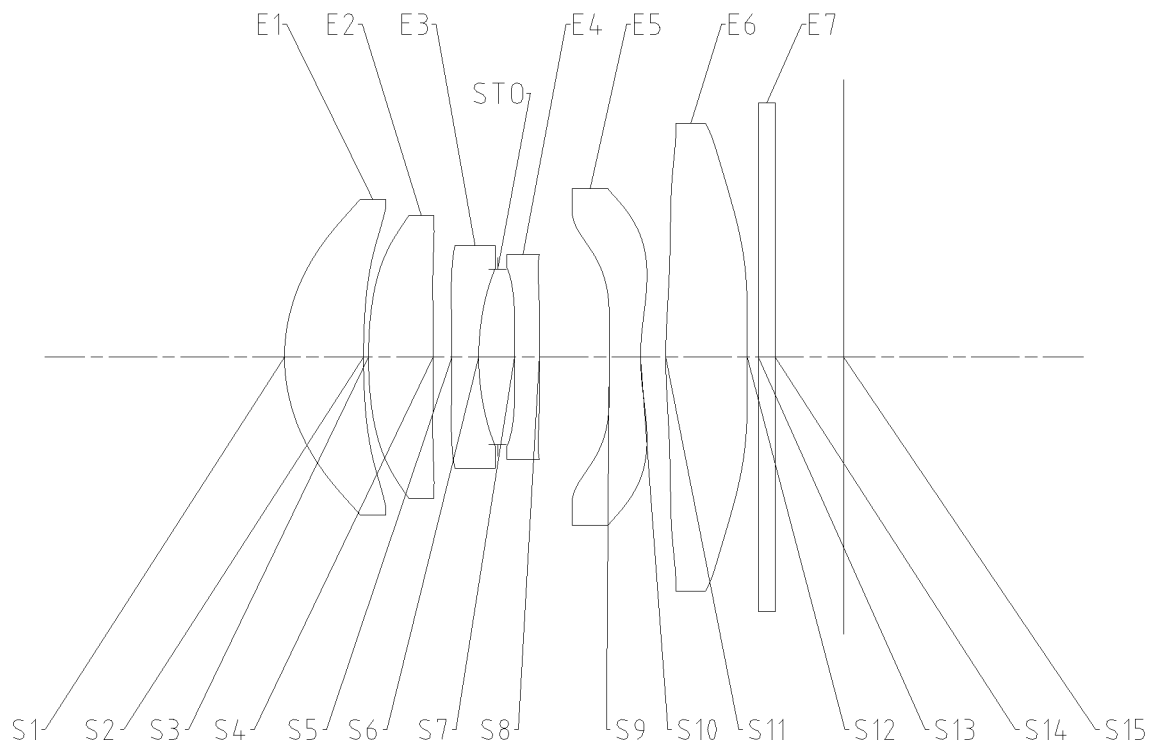
FIG. 3 shows a schematic structural diagram of an optical imaging lens according to Embodiment 2 of the present application.

An optical imaging lens according to Embodiment 2 of the present application will be described below with reference to FIGS. 3 to 4D. In this embodiment and the following embodiments, for the sake of brevity, the description of parts similar to those in Embodiment 1 will be omitted. FIG. 3 shows a schematic structural diagram of the optical imaging lens according to Embodiment 2 of the present application.

As shown in FIG. 3, the optical imaging lens includes in order from an object side to an image side along an optical axis: a first lens E1, a second lens E2, a third lens E3, a diaphragm STO, a fourth lens E4, a fifth lens E5, a sixth lens E6 and a filter E7.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a convex object side surface S9 and a concave image side surface S10. The sixth lens E6 has a positive refractive power, and has a convex object side surface S11 and a concave image side surface S12. The filter E7 has an object side surface S13 and an image side surface S14. The optical imaging lens has an imaging plane S15, and light from an object passes through the respective surfaces S1 to S14 in order and finally forms an image on the imaging plane S15.

In Embodiment 2, a value of a total effective focal length f of the optical imaging lens is 7.18 mm, a value of an on-axis distance TTL from the object side surface S1 of the first lens E1 to the imaging plane S15 is 7.00 mm, and a value of ImgH that is half of a diagonal length of an effective pixel region on the imaging plane S15 is 3.47 mm.

Table 3 shows a table of basic parameters of the optical imaging lens of Embodiment 2, wherein the units of the radius of curvature, thickness/distance, and focal length are all millimeters (mm). Table 4 shows high-order coefficients of each aspherical lens surface that are applicable in Embodiment 2, wherein the surface shape of each aspherical surface can be defined by formula (1) given in Embodiment 1 described above.

TABLE 3

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspherical | 2.2560 | 0.9896 | 1.55 | 56.1 | 5.07 | 0.0380 |
| S2 | Aspherical | 10.2797 | 0.0620 | | | | 24.4763 |
| S3 | Aspherical | 5.5637 | 0.8092 | 1.55 | 56.1 | 9.15 | 7.5700 |
| S4 | Aspherical | −46.3544 | 0.2341 | | | | −99.0000 |
| S5 | Aspherical | −35.8460 | 0.3370 | 1.67 | 20.4 | −4.28 | −99.0000 |
| S6 | Aspherical | 3.1101 | 0.2366 | | | | −0.0842 |
| STO | Spherical | Infinity | 0.2113 | | | | 0.0000 |
| S7 | Aspherical | 21.0546 | 0.3120 | 1.68 | 19.2 | 112.35 | 94.8243 |
| S8 | Aspherical | 28.9294 | 0.8743 | | | | −99.0000 |
| S9 | Aspherical | 12.2397 | 0.3920 | 1.55 | 56.1 | −6.49 | −3.1473 |
| S10 | Aspherical | 2.7162 | 0.3153 | | | | −0.2041 |
| S11 | Aspherical | 6.6092 | 1.0200 | 1.68 | 19.2 | 12.31 | −6.2837 |
| S12 | Aspherical | 29.8331 | 0.1403 | | | | −41.1416 |
| S13 | Spherical | Infinity | 0.2100 | 1.52 | 64.2 | | |
| S14 | Spherical | Infinity | 0.8564 | | | | |
| S15 | Spherical | Infinity | | | | | |

TABLE 4

| Surface No. | A4 | A6 | A8 | A10 | A12 | A14 | A16 | A18 | A20 |
|---|---|---|---|---|---|---|---|---|---|
| S1 | −4.7161E−03 | 1.1537E−03 | −3.0723E−03 | 2.2384E−03 | −1.0392E−03 | 2.7821E−04 | −4.1994E−05 | 2.5657E−06 | 0.0000E+00 |
| S2 | 1.8208E−02 | −1.6376E−02 | 1.7428E−02 | −1.0343E−02 | 3.5509E−03 | −7.7695E−04 | 9.9846E−05 | −5.6611E−06 | 0.0000E+00 |
| S3 | 1.9761E−02 | −1.6192E−02 | 2.0265E−02 | −1.2645E−02 | 4.8533E−03 | −1.3116E−03 | 2.3141E−04 | −2.0366E−05 | 0.0000E+00 |
| S4 | 2.0690E−03 | 6.5962E−03 | 1.2266E−03 | −5.5934E−03 | 3.6484E−03 | −1.0475E−03 | 1.1141E−04 | 0.0000E+00 | 0.0000E+00 |
| S5 | −1.2952E−02 | 5.1810E−02 | −4.8731E−02 | 2.6925E−02 | −7.5370E−03 | 8.4316E−04 | 0.0000E+00 | 0.0000E+00 | 0.0000E+00 |
| S6 | −3.0686E−02 | 6.0207E−02 | −4.8031E−02 | 1.0430E−02 | 1.3446E−02 | −7.2338E−03 | 3.6213E−04 | 1.8101E−04 | −3.6760E−04 |
| S7 | −8.5328E−02 | 1.3729E−02 | 7.1539E−03 | −1.0591E−01 | 2.6358E−01 | −3.1615E−01 | 1.9242E−01 | −4.8189E−02 | 0.0000E+00 |
| S8 | −4.9848E−02 | 9.0867E−03 | 1.8224E−02 | −2.7252E−02 | 2.7601E−02 | −1.1489E−02 | 2.1456E−03 | −3.0115E−04 | 0.0000E+00 |
| S9 | −1.3192E−01 | 5.0303E−02 | −4.4059E−02 | 3.9480E−02 | −2.7752E−02 | 1.2113E−02 | −2.6633E−03 | 2.2681E−04 | −3.0997E−07 |
| S10 | −1.6115E−01 | 9.0362E−02 | −5.8047E−02 | 2.7995E−02 | −9.6659E−03 | 2.2059E−03 | −2.9034E−04 | 1.6455E−05 | 0.0000E+00 |
| S11 | −5.1757E−02 | 3.0346E−02 | −1.3072E−02 | 3.8720E−03 | −7.4937E−04 | 9.2607E−05 | −6.9245E−06 | 2.7304E−07 | −3.8883E−09 |
| S12 | −4.2841E−02 | 1.3561E−02 | −3.9037E−03 | 9.1671E−04 | −1.2010E−04 | 2.0247E−06 | 1.5320E−06 | −1.8142E−07 | 6.5553E−09 |

Figure 4A:
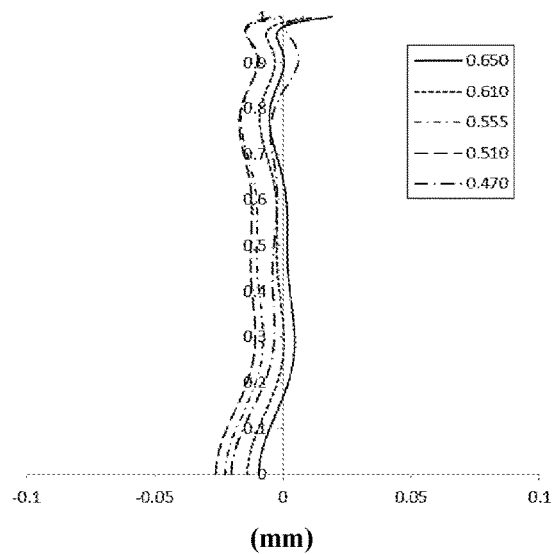
FIGS. 4A to 4D show a longitudinal aberration curve, astigmatism curve, distortion curve and lateral color curve of the optical imaging lens according to Embodiment 2, respectively.
Figure 4B:
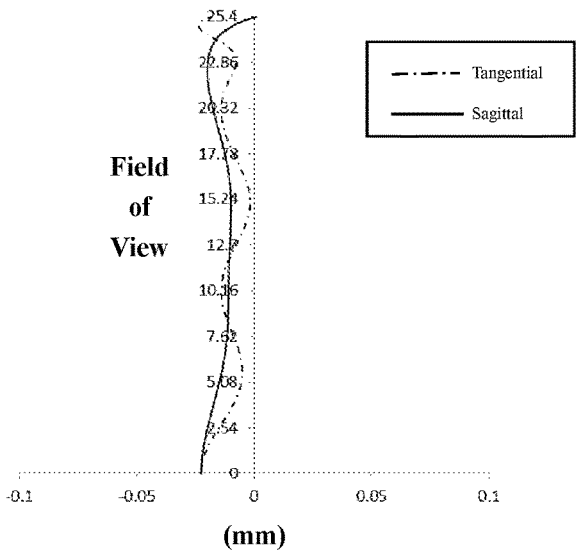
Figure 4C:
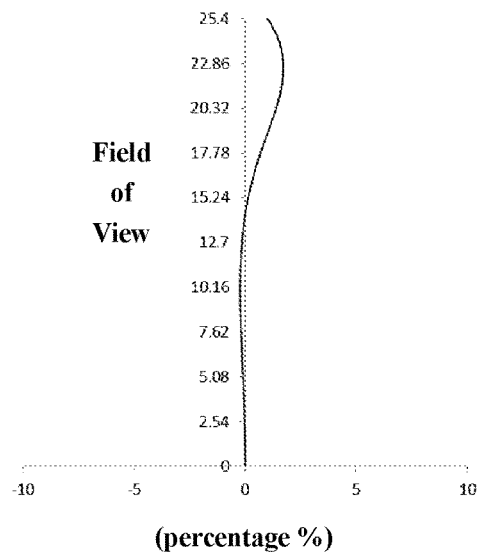
Figure 4D:
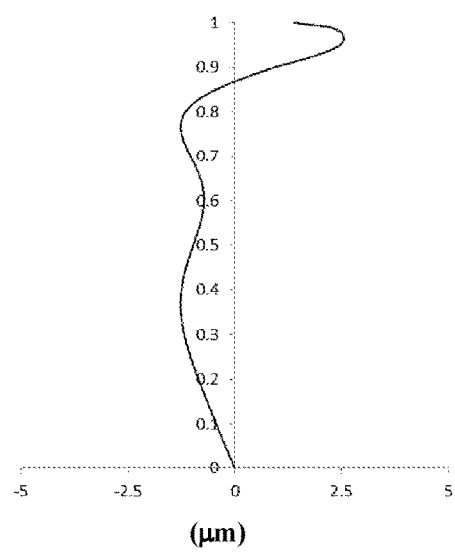

FIG. 4A shows a longitudinal aberration curve of the optical imaging lens according to Embodiment 2, which represents the deviation of the converged focal point after light of different wavelengths passes through the camera lens. FIG. 4B shows an astigmatism curve of the optical imaging lens according to Embodiment 2, which represents the curvature of the tangential image plane and the curvature of the sagittal image plane. FIG. 4C shows a distortion curve of the optical imaging lens according to Embodiment 2, which represents distortion magnitude values corresponding to different fields of view. FIG. 4D shows a lateral color curve of the optical imaging lens according to Embodiment 2, which represents the deviation of different image heights on the imaging plane after light passes through the camera lens. According to FIGS. 4A to 4D, it can be seen that the optical imaging lens given in Embodiment 2 can realize good quality of imaging.

Embodiment 3

Figure 5:
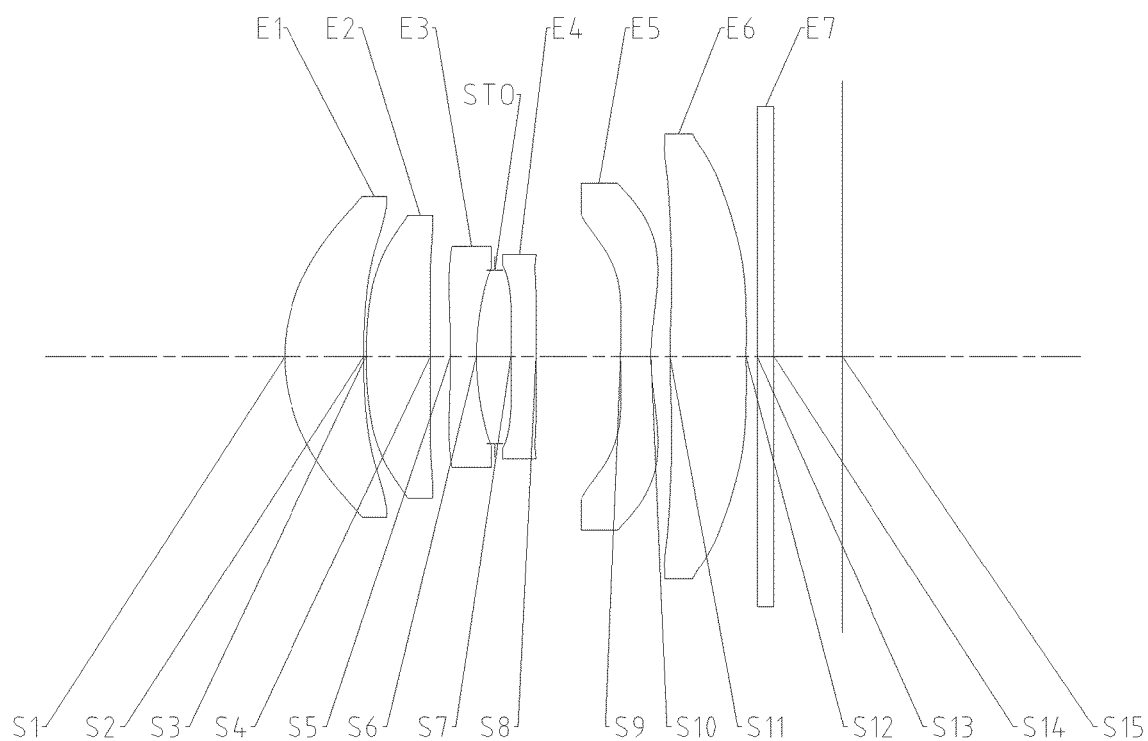
FIG. 5 shows a schematic structural diagram of an optical imaging lens according to Embodiment 3 of the present application.

An optical imaging lens according to Embodiment 3 of the present application will be described below with reference to FIGS. 5 to 6D. FIG. 5 shows a schematic structural diagram of the optical imaging lens according to Embodiment 3 of the present application.

As shown in FIG. 5, the optical imaging lens includes in order from an object side to an image side along an optical axis: a first lens E1, a second lens E2, a third lens E3, a diaphragm STO, a fourth lens E4, a fifth lens E5, a sixth lens E6 and a filter E7.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a concave image side surface S8. The fifth lens E5 has a negative refractive power, and has a convex object side surface S9 and a concave image side surface S10. The sixth lens E6 has a positive refractive power, and has a convex object side surface S11 and a concave image side surface S12. The filter E7 has an object side surface S13 and an image side surface S14. The optical imaging lens has an imaging plane S15, and light from an object passes through the respective surfaces S1 to S14 in order and finally forms an image on the imaging plane S15.

In Embodiment 3, a value of a total effective focal length f of the optical imaging lens is 7.29 mm, a value of an on-axis distance TTL from the object side surface S1 of the first lens E1 to the imaging plane S15 is 7.00 mm, and a value of ImgH that is half of a diagonal length of an effective pixel region on the imaging plane S15 is 3.47 mm.

Table 5 shows a table of basic parameters of the optical imaging lens of Embodiment 3, wherein the units of the radius of curvature, thickness/distance, and focal length are all millimeters (mm). Table 6 shows high-order coefficients of each aspherical lens surface that are applicable in Embodiment 3, wherein the surface shape of each aspherical surface can be defined by formula (1) given in Embodiment 1 described above.

TABLE 5

| Surface No. | Surface type | Radius of curvature | Thickness/ Distance | Material Refractive index | Material Abbe number | Focal length | Conic coefficient |
|---|---|---|---|---|---|---|---|
| OBJ | Spherical | Infinity | Infinity | | | | |
| S1 | Aspherical | 2.2684 | 0.9924 | 1.55 | 56.1 | 5.11 | 0.0505 |
| S2 | Aspherical | 10.2380 | 0.0300 | | | | 24.2019 |
| S3 | Aspherical | 5.7232 | 0.8069 | 1.55 | 56.1 | 8.98 | 7.8319 |
| S4 | Aspherical | −32.5390 | 0.2524 | | | | −98.9947 |
| S5 | Aspherical | −12.6616 | 0.3250 | 1.67 | 20.4 | −4.19 | −99.0000 |
| S6 | Aspherical | 3.6129 | 0.2310 | | | | 0.3739 |
| STO | Spherical | Infinity | 0.2018 | | | | 0.0000 |
| S7 | Aspherical | 12.6173 | 0.3150 | 1.68 | 19.2 | 65.57 | −28.3395 |
| S8 | Aspherical | 17.4443 | 1.0664 | | | | 16.6236 |
| S9 | Aspherical | 11.6128 | 0.3800 | 1.55 | 56.1 | −7.25 | −12.8799 |
| S10 | Aspherical | 2.9177 | 0.2398 | | | | −0.2649 |
| S11 | Aspherical | 8.7614 | 0.9529 | 1.68 | 19.2 | 18.27 | −11.6793 |
| S12 | Aspherical | 28.6556 | 0.1401 | | | | 99.0000 |

TABLE 5-continued

| Surface No. | Surface type | Radius of curvature | Thickness/ Distance | Material Refractive index | Abbe number | Focal length | Conic coefficient |
|---|---|---|---|---|---|---|---|
| S13 | Spherical | Infinity | 0.2100 | 1.52 | 64.2 | | |
| S14 | Spherical | Infinity | 0.8563 | | | | |
| S15 | Spherical | Infinity | | | | | |

TABLE 6

| Surface No. | A4 | A6 | A8 | A10 | A12 | A14 | A16 | A18 | A20 |
|---|---|---|---|---|---|---|---|---|---|
| S1 | −3.7438E−03 | −2.0445E−03 | 1.4000E−03 | −1.3311E−03 | 5.7160E−04 | −1.3286E−04 | 1.3597E−05 | −5.3333E−07 | 0.0000E+00 |
| S2 | 1.7468E−02 | −4.6486E−03 | −6.1799E−03 | 1.1375E−02 | −6.7431E−03 | 1.8358E−03 | −2.3995E−04 | 1.2231E−05 | 0.0000E+00 |
| S3 | 1.8942E−02 | −1.7298E−03 | −1.1137E−02 | 1.9274E−02 | −1.2224E−02 | 3.9067E−03 | −6.6113E−04 | 4.6998E−05 | 0.0000E+00 |
| S4 | 8.3017E−03 | 1.3508E−03 | 3.3679E−03 | −3.2669E−03 | 1.4757E−03 | −4.4429E−04 | 5.7559E−05 | 0.0000E+00 | 0.0000E+00 |
| S5 | 6.9406E−03 | 2.7850E−02 | −2.6938E−02 | 1.3420E−02 | −3.0685E−03 | 2.6331E−04 | 0.0000E+00 | 0.0000E+00 | 0.0000E+00 |
| S6 | −1.9287E−02 | 7.1723E−02 | −1.9705E−01 | 5.0375E−01 | −9.2014E−01 | 1.0685E+00 | −7.4723E−01 | 2.8778E−01 | −4.7211E−02 |
| S7 | −9.4892E−02 | 4.3639E−02 | −1.4299E−01 | 3.2338E−01 | −4.3814E−01 | 3.3966E−01 | −1.3459E−01 | 1.9562E−02 | 0.0000E+00 |
| S8 | −5.7500E−02 | 1.1519E−02 | 1.5250E−02 | −2.4898E−02 | 2.7284E−02 | −1.2257E−02 | 2.2447E−03 | −1.8678E−04 | 0.0000E+00 |
| S9 | −8.2830E−02 | −3.0290E−02 | 6.6393E−02 | −7.2039E−02 | 4.7949E−02 | −2.0122E−02 | 5.3116E−03 | −7.9973E−04 | 5.1670E−05 |
| S10 | −1.1601E−01 | 3.9398E−02 | −1.4435E−02 | 2.0300E−03 | 5.8257E−04 | −2.8843E−04 | 4.4685E−05 | −2.4635E−06 | 0.0000E+00 |
| S11 | −6.0715E−02 | 4.0908E−02 | −2.0585E−02 | 7.3336E−03 | −1.7503E−03 | 2.7136E−04 | −2.6366E−05 | 1.4694E−06 | −3.5937E−08 |
| S12 | −5.7333E−02 | 2.4978E−02 | −1.1786E−02 | 4.4932E−03 | −1.1239E−03 | 1.7568E−04 | −1.6649E−05 | 8.7286E−07 | −1.9213E−08 |

Figure 6A:
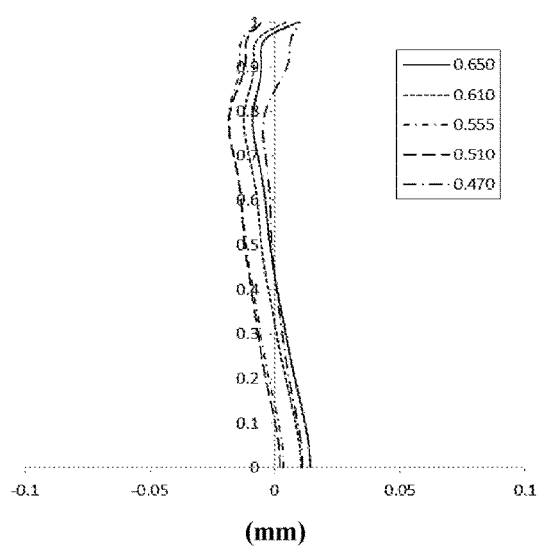
FIGS. 6A to 6D show a longitudinal aberration curve, astigmatism curve, distortion curve and lateral color curve of the optical imaging lens according to Embodiment 3, respectively.
Figure 6B:
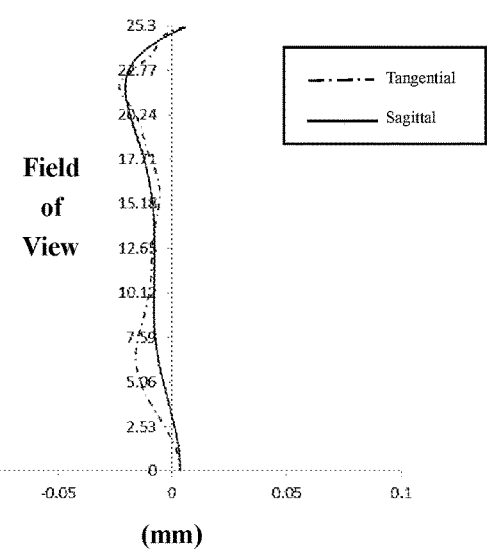
Figures 6C, 6D:
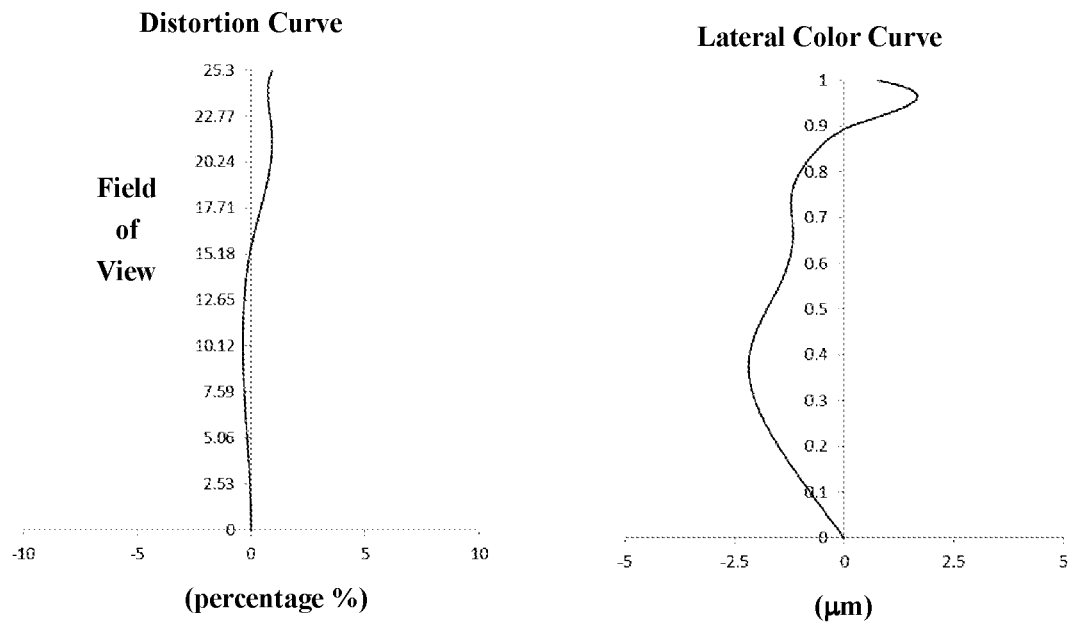

FIG. 6A shows a longitudinal aberration curve of the optical imaging lens according to Embodiment 3, which represents the deviation of the converged focal point after light of different wavelengths passes through the camera lens. FIG. 6B shows an astigmatism curve of the optical imaging lens according to Embodiment 3, which represents the curvature of the tangential image plane and the curvature of the sagittal image plane. FIG. 6C shows a distortion curve of the optical imaging lens according to Embodiment 3, which represents distortion magnitude values corresponding to different fields of view. FIG. 6D shows a lateral color curve of the optical imaging lens according to Embodiment 3, which represents the deviation of different image heights on the imaging plane after light passes through the camera lens. According to FIGS. 6A to 6D, it can be seen that the optical imaging lens given in Embodiment 3 can realize good quality of imaging.

Embodiment 4

Figure 7:
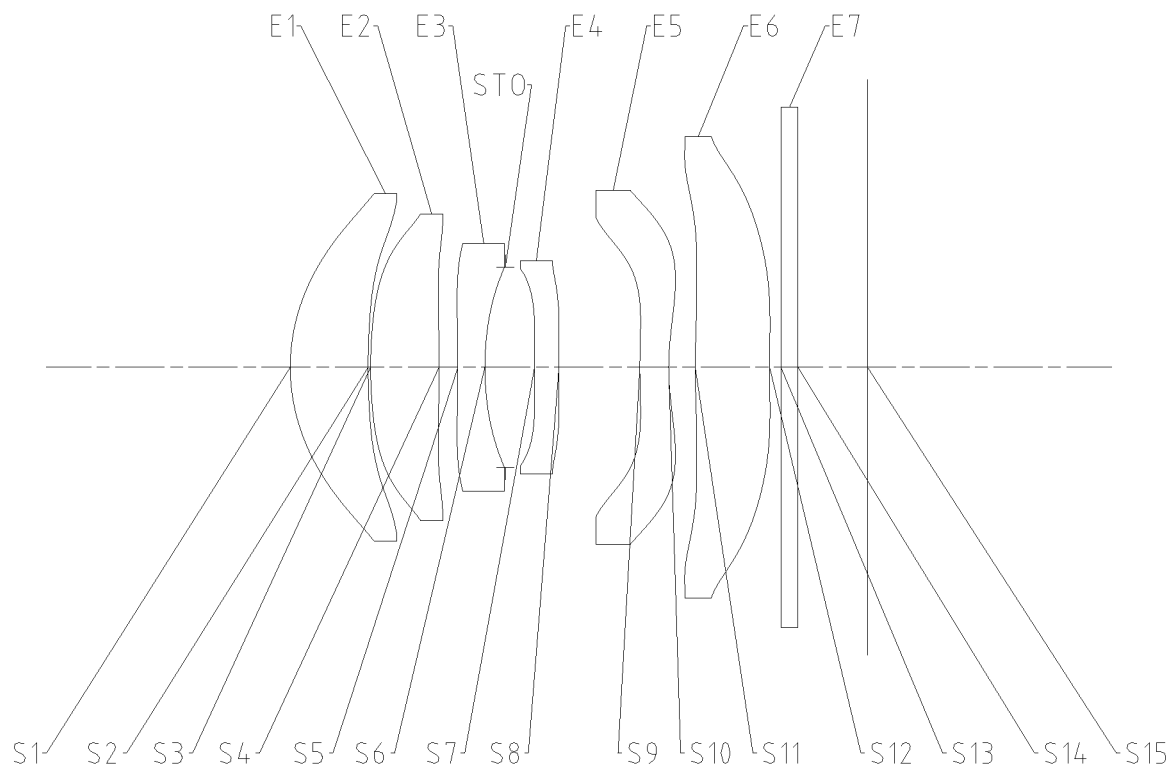
FIG. 7 shows a schematic structural diagram of an optical imaging lens according to Embodiment 4 of the present application.

An optical imaging lens according to Embodiment 4 of the present application will be described below with reference to FIGS. 7 to 8D. FIG. 7 shows a schematic structural diagram of the optical imaging lens according to Embodiment 4 of the present application.

As shown in FIG. 7, the optical imaging lens includes in order from an object side to an image side along an optical axis: a first lens E1, a second lens E2, a third lens E3, a diaphragm STO, a fourth lens E4, a fifth lens E5, a sixth lens E6 and a filter E7.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a negative refractive power, and has a convex object side surface S7 and a concave image side surface S8. The fifth lens E5 has a negative refractive power, and has a convex object side surface S9 and a concave image side surface S10. The sixth lens E6 has a positive refractive power, and has a convex object side surface S11 and a concave image side surface S12. The filter E7 has an object side surface S13 and an image side surface S14. The optical imaging lens has an imaging plane S15, and light from an object passes through the respective surfaces S1 to S14 in order and finally forms an image on the imaging plane S15.

In Embodiment 4, a value of a total effective focal length f of the optical imaging lens is 7.49 mm, a value of an on-axis distance TTL from the object side surface S1 of the first lens E1 to the imaging plane S15 is 7.10 mm, and a value of ImgH that is half of a diagonal length of an effective pixel region on the imaging plane S15 is 3.47 mm.

Table 7 shows a table of basic parameters of the optical imaging lens of Embodiment 4, wherein the units of the radius of curvature, thickness/distance, and focal length are all millimeters (mm). Table 8 shows high-order coefficients of each aspherical lens surface that are applicable in Embodiment 4, wherein the surface shape of each aspherical surface can be defined by formula (1) given in Embodiment 1 described above.

TABLE 7

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspherical | 2.2856 | 0.9584 | 1.55 | 56.1 | 5.15 | 0.0141 |
| S2 | Aspherical | 10.4434 | 0.0300 | | | | 23.2894 |
| S3 | Aspherical | 6.1836 | 0.8416 | 1.55 | 56.1 | 8.80 | 7.9167 |

TABLE 7-continued

| Surface No. | Surface type | Radius of curvature | Thickness/ Distance | Material Refractive index | Abbe number | Focal length | Conic coefficient |
|---|---|---|---|---|---|---|---|
| S4 | Aspherical | −20.4921 | 0.2319 | | | | −45.0313 |
| S5 | Aspherical | −16.4567 | 0.3320 | 1.67 | 20.4 | −4.28 | −40.1801 |
| S6 | Aspherical | 3.4761 | 0.2523 | | | | 2.0459 |
| STO | Spherical | Infinity | 0.3589 | | | | 0.0000 |
| S7 | Aspherical | 18.1314 | 0.3000 | 1.68 | 19.2 | −2166.75 | −97.4800 |
| S8 | Aspherical | 17.7905 | 0.9941 | | | | −99.0000 |
| S9 | Aspherical | 8.3595 | 0.3550 | 1.55 | 56.1 | −8.49 | −32.4823 |
| S10 | Aspherical | 2.9378 | 0.3260 | | | | −0.7377 |
| S11 | Aspherical | 8.3852 | 0.9154 | 1.68 | 19.2 | 26.35 | −4.5955 |
| S12 | Aspherical | 15.1120 | 0.1390 | | | | −46.8633 |
| S13 | Spherical | Infinity | 0.2100 | 1.52 | 64.2 | | |
| S14 | Spherical | Infinity | 0.8553 | | | | |
| S15 | Spherical | Infinity | | | | | |

TABLE 8

| Surface No. | A4 | A6 | A8 | A10 | A12 | A14 | A16 | A18 | A20 |
|---|---|---|---|---|---|---|---|---|---|
| S1 | −4.8571E−03 | 1.8162E−03 | −4.8552E−03 | 4.6630E−03 | −2.8349E−03 | 1.0486E−03 | −2.3232E−04 | 2.7878E−05 | −1.3965E−06 |
| S2 | 2.4396E−02 | −3.8118E−02 | 5.9093E−02 | −5.0999E−02 | 2.7680E−02 | −9.5868E−03 | 2.0090E−03 | −2.3028E−04 | 1.1061E−05 |
| S3 | 2.8030E−02 | −4.2773E−02 | 7.2640E−02 | −6.7045E−02 | 4.0547E−02 | −1.6186E−02 | 4.1000E−03 | −6.0025E−04 | 3.8500E−05 |
| S4 | 1.1106E−02 | −2.6844E−03 | 1.3475E−02 | −1.6792E−02 | 1.1492E−02 | −4.3199E−03 | 8.0448E−04 | −5.8099E−05 | 1.4989E−07 |
| S5 | 1.6561E−02 | 1.5198E−02 | −8.1022E−03 | −1.0839E−02 | 2.0357E−02 | −1.4672E−02 | 5.6427E−03 | −1.1344E−03 | 9.4255E−05 |
| S6 | −1.2095E−02 | 6.1765E−02 | −1.7901E−01 | 4.1623E−01 | −6.7161E−01 | 6.9884E−01 | −4.4522E−01 | 1.5773E−01 | −2.3851E−02 |
| S7 | −9.4467E−02 | −5.8409E−02 | 2.9368E−01 | −8.1799E−01 | 1.3728E+00 | −1.4283E+00 | 8.9908E−01 | −3.1225E−01 | 4.5482E−02 |
| S8 | −8.0842E−02 | 3.0210E−02 | −9.0296E−02 | 2.5602E−01 | −4.2209E−01 | 4.2189E−01 | −2.4791E−01 | 7.9106E−02 | −1.0583E−02 |
| S9 | −8.9524E−02 | −1.0881E−02 | 2.9335E−02 | −3.6147E−02 | 2.6209E−02 | −1.2054E−02 | 3.5971E−03 | −6.1402E−04 | 4.4196E−05 |
| S10 | −1.2775E−01 | 6.7251E−02 | −4.2523E−02 | 1.8846E−02 | −6.0712E−03 | 1.3181E−03 | −1.6226E−04 | 8.3459E−06 | 0.0000E+00 |
| S11 | −7.3235E−02 | 5.1795E−02 | −2.1066E−02 | 4.4516E−03 | −3.9719E−04 | −1.9573E−05 | 8.0919E−06 | −7.2226E−07 | 2.2718E−08 |
| S12 | −6.8891E−02 | 3.1221E−02 | −1.3293E−02 | 4.8445E−03 | −1.2900E−03 | 2.2661E−04 | −2.4814E−05 | 1.5436E−06 | −4.1693E−08 |

Figure 8A:
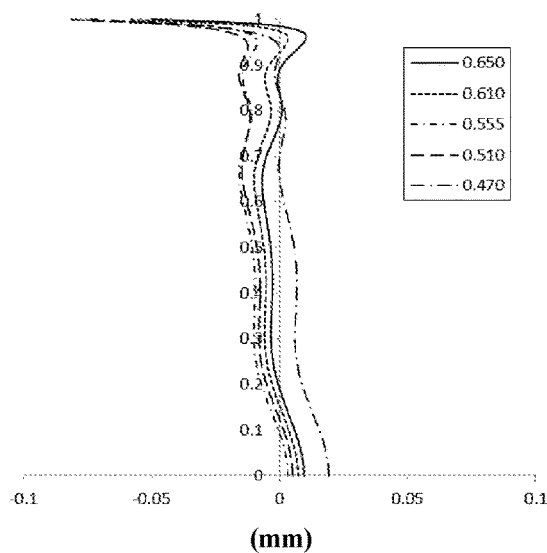
FIGS. 8A to 8D show a longitudinal aberration curve, astigmatism curve, distortion curve and lateral color curve of the optical imaging lens according to Embodiment 4, respectively.
Figure 8B:
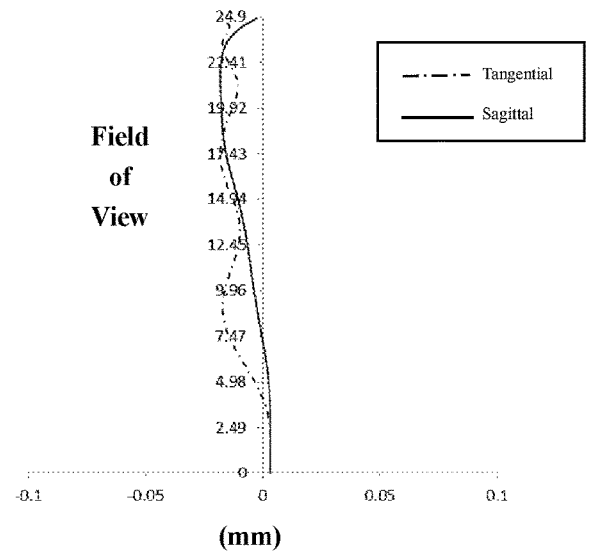
Figure 8C:
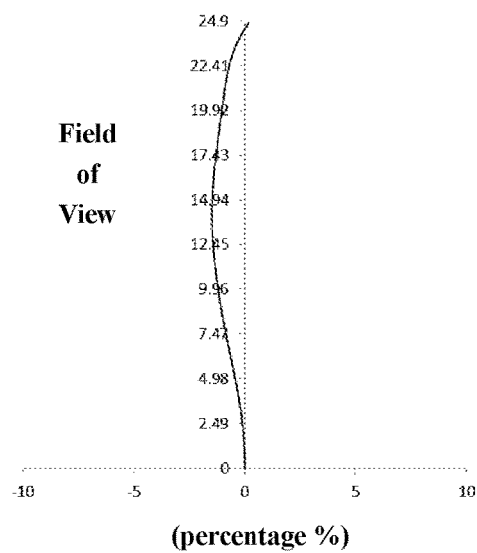
Figure 8D:
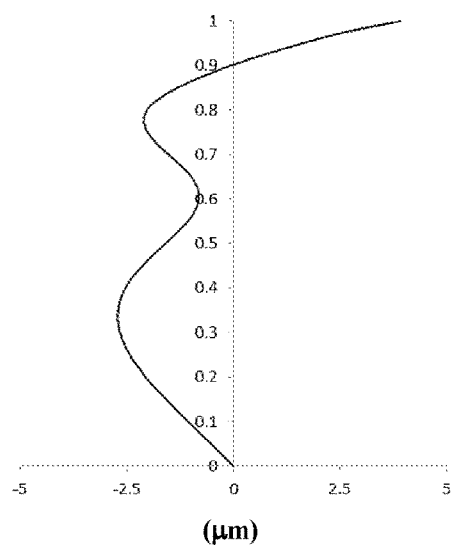

FIG. 8A shows a longitudinal aberration curve of the optical imaging lens according to Embodiment 4, which represents the deviation of the converged focal point after light of different wavelengths passes through the camera lens. FIG. 8B shows an astigmatism curve of the optical imaging lens according to Embodiment 4, which represents the curvature of the tangential image plane and the curvature of the sagittal image plane. FIG. 8C shows a distortion curve of the optical imaging lens according to Embodiment 4, which represents distortion magnitude values corresponding to different fields of view. FIG. 8D shows a lateral color curve of the optical imaging lens according to Embodiment 4, which represents the deviation of different image heights on the imaging plane after light passes through the camera lens. According to FIGS. 8A to 8D, it can be seen that the optical imaging lens given in Embodiment 4 can realize good quality of imaging.

Embodiment 5

Figure 9:
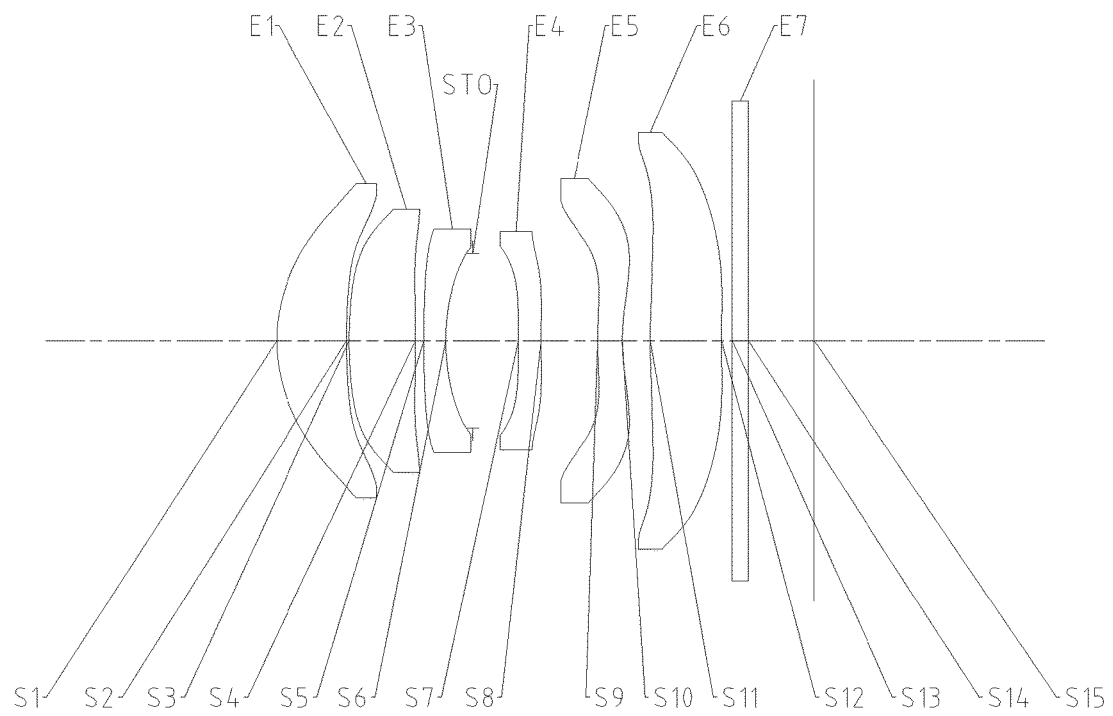
FIG. 9 shows a schematic structural diagram of an optical imaging lens according to Embodiment 5 of the present application.

An optical imaging lens according to Embodiment 5 of the present application will be described below with reference to FIGS. 9 to 10D. FIG. 9 shows a schematic structural diagram of the optical imaging lens according to Embodiment 5 of the present application.

As shown in FIG. 9, the optical imaging lens includes in order from an object side to an image side along an optical axis: a first lens E1, a second lens E2, a third lens E3, a diaphragm STO, a fourth lens E4, a fifth lens E5, a sixth lens E6 and a filter E7.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a convex object side surface S5 and a concave image side surface S6. The fourth lens E4 has a negative refractive power, and has a convex object side surface S7 and a concave image side surface S8. The fifth lens E5 has a negative refractive power, and has a convex object side surface S9 and a concave image side surface S10. The sixth lens E6 has a positive refractive power, and has a convex object side surface S11 and a concave image side surface S12. The filter E7 has an object side surface S13 and an image side surface S14. The optical imaging lens has an imaging plane S15, and light from an object passes through the respective surfaces S1 to S14 in order and finally forms an image on the imaging plane S15.

In Embodiment 5, a value of a total effective focal length f of the optical imaging lens is 7.49 mm, a value of an on-axis distance TTL from the object side surface S1 of the first lens E1 to the imaging plane S15 is 7.00 mm, and a value of ImgH that is half of a diagonal length of an effective pixel region on the imaging plane S15 is 2.77 mm.

Table 9 shows a table of basic parameters of the optical imaging lens of Embodiment 5, wherein the units of the radius of curvature, thickness/distance, and focal length are all millimeters (mm). Table 10 shows high-order coefficients of each aspherical lens surface that are applicable in Embodiment 5, wherein the surface shape of each aspherical surface can be defined by formula (1) given in Embodiment 1 described above.

TABLE 9

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspherical | 2.1933 | 0.9136 | 1.55 | 56.1 | 4.98 | −0.0353 |
| S2 | Aspherical | 9.6693 | 0.0347 | | | | 19.5502 |
| S3 | Aspherical | 6.4369 | 0.8599 | 1.55 | 56.1 | 9.09 | 8.9551 |
| S4 | Aspherical | −20.6069 | 0.1100 | | | | −98.8516 |
| S5 | Aspherical | 18.6287 | 0.2850 | 1.67 | 20.4 | −4.91 | −85.7459 |
| S6 | Aspherical | 2.7615 | 0.3520 | | | | 1.4191 |
| STO | Spherical | Infinity | 0.5905 | | | | 0.0000 |
| S7 | Aspherical | 353.6934 | 0.2950 | 1.68 | 19.2 | −21.51 | −99.0000 |
| S8 | Aspherical | 13.9908 | 0.7453 | | | | −92.0641 |
| S9 | Aspherical | 6.0333 | 0.3200 | 1.55 | 56.1 | −9.25 | −0.1172 |
| S10 | Aspherical | 2.6978 | 0.3623 | | | | −3.1039 |
| S11 | Aspherical | 7.8332 | 0.9268 | 1.68 | 19.2 | 24.89 | −4.7742 |
| S12 | Aspherical | 13.9301 | 0.1393 | | | | 3.6953 |
| S13 | Spherical | Infinity | 0.2100 | 1.52 | 64.2 | | |
| S14 | Spherical | Infinity | 0.8557 | | | | |
| S15 | Spherical | Infinity | | | | | |

TABLE 10

| Surface No. | A4 | A6 | A8 | A10 | A12 | A14 | A16 | A18 | A20 |
|---|---|---|---|---|---|---|---|---|---|
| S1 | −5.1097E−03 | 1.5412E−03 | −4.4323E−03 | 4.2302E−03 | −2.6140E−03 | 1.0272E−03 | −2.4684E−04 | 3.1613E−05 | −1.6406E−06 |
| S2 | 1.2233E−02 | −4.3894E−02 | 9.8868E−02 | −9.7981E−02 | 5.9950E−02 | −2.3344E−02 | 5.4821E−03 | −7.0255E−04 | 3.7736E−05 |
| S3 | 1.9082E−02 | −5.5158E−02 | 1.2927E−01 | −1.3696E−01 | 9.2434E−02 | −4.0639E−02 | 1.1149E−02 | −1.7330E−03 | 1.1626E−04 |
| S4 | 2.8975E−02 | −4.6798E−02 | 8.8277E−02 | −9.6418E−02 | 6.5761E−02 | −2.7709E−02 | 6.8692E−03 | −9.1559E−04 | 5.1027E−05 |
| S5 | 9.5376E−03 | −2.8610E−02 | 8.9509E−02 | −1.2312E−01 | 1.0151E−01 | −5.2555E−02 | 1.6809E−02 | −3.0491E−03 | 2.4366E−04 |
| S6 | −2.8753E−02 | 5.3970E−02 | −1.8436E−01 | 5.2839E−01 | −9.1025E−01 | 9.4664E−01 | −5.8157E−01 | 1.9454E−01 | −2.7172E−02 |
| S7 | −1.0718E−01 | 3.5304E−02 | −1.4728E−01 | 3.3962E−01 | −4.6361E−01 | 3.8961E−01 | −1.9731E−01 | 5.6279E−02 | −7.2981E−03 |
| S8 | −9.1448E−02 | 3.3201E−02 | −6.9253E−02 | 1.2441E−01 | −1.2493E−01 | 7.6523E−02 | −2.6420E−02 | 4.4475E−03 | −2.5451E−04 |
| S9 | −9.9541E−02 | −5.0976E−02 | 1.2136E−01 | −1.6035E−01 | 1.1904E−01 | −5.0431E−02 | 1.2402E−02 | −1.6620E−03 | 9.4148E−05 |
| S10 | −1.1934E−01 | 6.4197E−02 | −3.8435E−02 | 1.5514E−02 | −6.4831E−03 | 2.8500E−03 | −8.1848E−04 | 1.2074E−04 | −6.9901E−06 |
| S11 | −6.9505E−02 | 4.3301E−02 | −5.9137E−03 | −6.7354E−03 | 3.8794E−03 | −9.3796E−04 | 1.1911E−04 | −7.7381E−06 | 2.0207E−07 |
| S12 | −7.2912E−02 | 3.1719E−02 | −1.3971E−02 | 6.3791E−03 | −2.1988E−03 | 4.7313E−04 | −5.9328E−05 | 3.9498E−06 | −1.0716E−07 |

Figures 10A, 10B:
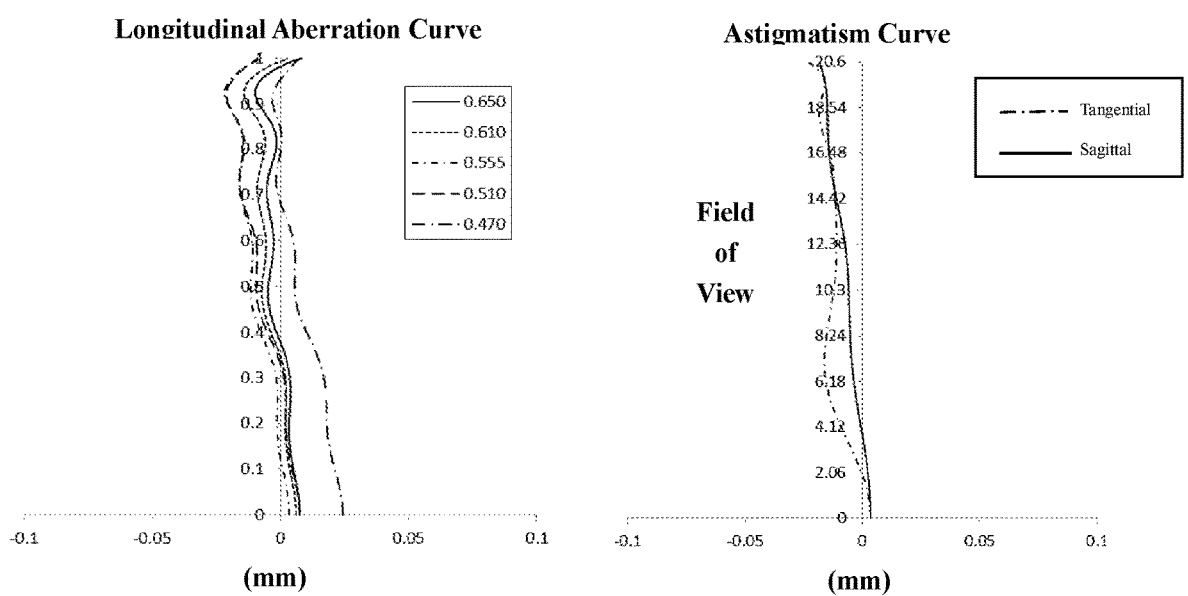

FIG. 10A shows a longitudinal aberration curve of the optical imaging lens according to Embodiment 5, which represents the deviation of the converged focal point after light of different wavelengths passes through the camera lens. FIG. 10B shows an astigmatism curve of the optical imaging lens according to Embodiment 5, which represents the curvature of the tangential image plane and the curvature of the sagittal image plane. FIG. 10C shows a distortion curve of the optical imaging lens according to Embodiment 5, which represents distortion magnitude values corresponding to different fields of view. FIG. 10D shows a lateral color curve of the optical imaging lens according to Embodiment 5, which represents the deviation of different image heights on the imaging plane after light passes through the camera lens. According to FIGS. 10A to 10D, it can be seen that the optical imaging lens given in Embodiment 5 can realize good quality of imaging.

Embodiment 6

An optical imaging lens according to Embodiment 6 of the present application will be described below with reference to FIGS. 11 to 12D. FIG. 11 shows a schematic structural diagram of the optical imaging lens according to Embodiment 6 of the present application.

As shown in FIG. 11, the optical imaging lens includes in order from an object side to an image side along an optical axis: a first lens E1, a second lens E2, a third lens E3, a diaphragm STO, a fourth lens E4, a fifth lens E5, a sixth lens E6 and a filter E7.

The first lens E1 has a positive refractive power, and has a convex object side surface S1 and a concave image side surface S2. The second lens E2 has a positive refractive power, and has a convex object side surface S3 and a convex image side surface S4. The third lens E3 has a negative refractive power, and has a concave object side surface S5 and a concave image side surface S6. The fourth lens E4 has a positive refractive power, and has a convex object side surface S7 and a convex image side surface S8. The fifth lens E5 has a negative refractive power, and has a concave object side surface S9 and a concave image side surface S10. The sixth lens E6 has a positive refractive power, and has a convex object side surface S11 and a concave image side surface S12. The filter E7 has an object side surface S13 and an image side surface S14. The optical imaging lens has an imaging plane S15, and light from an object passes through the respective surfaces S1 to S14 in order and finally forms an image on the imaging plane S15.

In Embodiment 6, a value of a total effective focal length f of the optical imaging lens is 7.49 mm, a value of an on-axis distance TTL from the object side surface S1 of the first lens E1 to the imaging plane S15 is 7.15 mm, and a value of ImgH that is half of a diagonal length of an effective pixel region on the imaging plane S15 is 3.47 mm.

Table 11 shows a table of basic parameters of the optical imaging lens of Embodiment 6, wherein the units of the radius of curvature, thickness/distance, and focal length are all millimeters (mm). Table 12 shows high-order coefficients of each aspherical lens surface that are applicable in Embodiment 6, wherein the surface shape of each aspherical surface can be defined by formula (1) given in Embodiment 1 described above.

TABLE 11

| Surface No. | Surface type | Radius of curvature | Thickness/ Distance | Material Refractive index | Abbe number | Focal length | Conic coefficient |
|---|---|---|---|---|---|---|---|
| OBJ | Spherical | Infinity | Infinity | | | | |
| S1 | Aspherical | 2.2769 | 0.9900 | 1.55 | 56.1 | 5.09 | −0.0097 |
| S2 | Aspherical | 10.7014 | 0.0550 | | | | 25.6748 |
| S3 | Aspherical | 6.1347 | 0.7536 | 1.55 | 56.1 | 10.83 | 7.8824 |
| S4 | Aspherical | −157.1759 | 0.3452 | | | | −99.0000 |
| S5 | Aspherical | −5.4710 | 0.2850 | 1.67 | 20.4 | −4.49 | −53.2700 |
| S6 | Aspherical | 6.7386 | 0.2061 | | | | −2.8549 |
| STO | Spherical | Infinity | 0.2073 | | | | 0.0000 |
| S7 | Aspherical | 7.6861 | 0.2800 | 1.68 | 19.2 | 142.47 | −49.6770 |
| S8 | Aspherical | 8.2281 | 1.3649 | | | | −49.2474 |
| S9 | Aspherical | −42.4909 | 0.3050 | 1.55 | 56.1 | −5.63 | −55.7075 |
| S10 | Aspherical | 3.3217 | 0.1020 | | | | 0.0534 |
| S11 | Aspherical | 4.3883 | 0.9641 | 1.68 | 19.2 | 8.56 | −23.6723 |
| S12 | Aspherical | 16.4035 | 0.2146 | | | | −99.0000 |
| S13 | Spherical | Infinity | 0.2100 | 1.52 | 64.2 | | |
| S14 | Spherical | Infinity | 0.8650 | | | | |
| S15 | Spherical | Infinity | | | | | |

TABLE 12

| Surface No. | A4 | A6 | A8 | A10 | A12 | A14 | A16 | A18 | A20 |
|---|---|---|---|---|---|---|---|---|---|
| S1 | −2.8956E−03 | −9.5019E−05 | −9.8181E−04 | 5.7804E−04 | −2.5661E−04 | 5.1605E−05 | 3.7217E−07 | −2.4381E−06 | 2.9975E−07 |
| S2 | 2.6882E−02 | −2.9378E−02 | 3.2364E−02 | −2.4541E−02 | 1.3026E−02 | −4.6603E−03 | 1.0236E−03 | −1.2321E−04 | 6.2285E−06 |
| S3 | 2.8720E−02 | −3.2891E−02 | 4.2524E−02 | −3.6136E−02 | 2.1936E−02 | −9.0082E−03 | 2.3200E−03 | −3.3980E−04 | 2.1599E−05 |
| S4 | 3.8590E−03 | 2.5784E−03 | 6.9304E−05 | 6.2236E−04 | −1.6356E−03 | 1.3561E−03 | −5.8503E−04 | 1.2353E−04 | −9.9646E−06 |
| S5 | 2.4425E−02 | 2.9020E−02 | −4.1852E−02 | 3.0911E−02 | −9.3971E−03 | −2.6194E−03 | 3.5228E−03 | −1.2464E−03 | 1.6285E−04 |
| S6 | 3.3379E−02 | 6.1555E−02 | −2.1879E−01 | 5.5231E−01 | −9.2478E−01 | 9.9303E−01 | −6.4985E−01 | 2.3617E−01 | −3.6479E−02 |
| S7 | −1.0681E−01 | 5.2686E−02 | −1.8105E−01 | 5.2196E−01 | −9.4506E−01 | 1.0762E+00 | −7.4680E−01 | 2.8824E−01 | −4.7663E−02 |
| S8 | −6.7432E−02 | 4.4507E−02 | −1.0593E−01 | 2.4830E−01 | −3.4371E−01 | 2.9619E−01 | −1.5436E−01 | 4.4287E−02 | −5.3768E−03 |
| S9 | −2.8848E−02 | −5.0375E−02 | 6.9583E−02 | −5.1870E−02 | 2.5035E−02 | −7.7925E−03 | 1.5040E−03 | −1.6337E−04 | 7.6137E−06 |
| S10 | −6.4584E−02 | −6.1049E−04 | 1.4962E−02 | −1.1121E−02 | 4.2958E−03 | −9.7382E−04 | 1.2922E−04 | −9.2646E−06 | 2.7650E−07 |
| S11 | −1.8093E−02 | 1.2611E−02 | −6.4711E−03 | 2.0472E−03 | −4.2983E−04 | 6.4100E−05 | −6.8486E−06 | 4.6128E−07 | −1.3921E−08 |
| S12 | −3.6261E−02 | 1.5862E−02 | −6.1387E−03 | 1.8141E−03 | −3.8743E−04 | 5.5406E−05 | −4.8463E−06 | 2.2242E−07 | −3.6876E−09 |

Figure 12A:
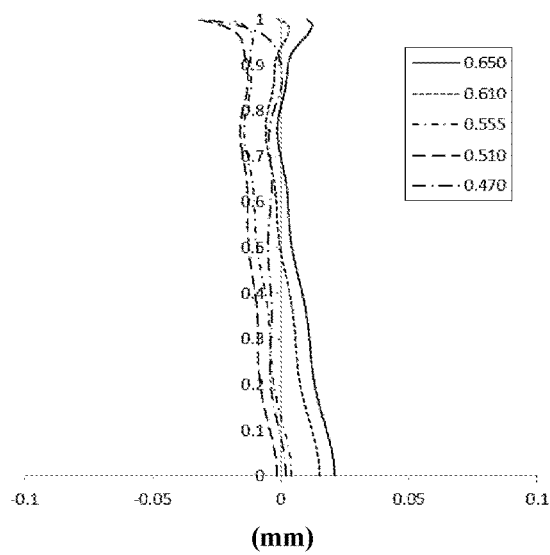
FIGS. 12A to 12D show a longitudinal aberration curve, astigmatism curve, distortion curve and lateral color curve of the optical imaging lens according to Embodiment 6, respectively.
Figure 12B:
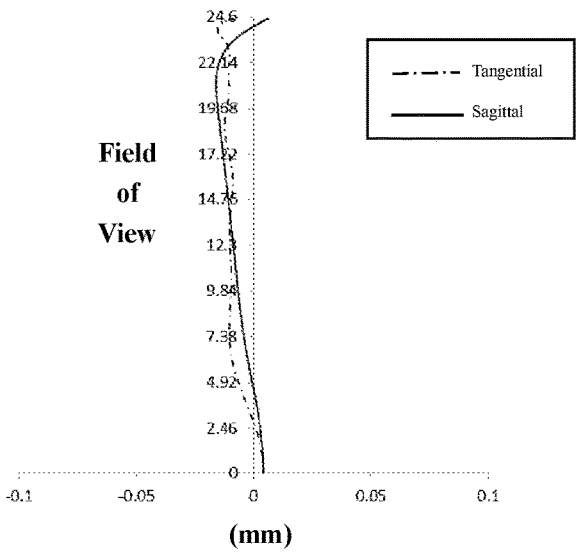
Figure 12C:
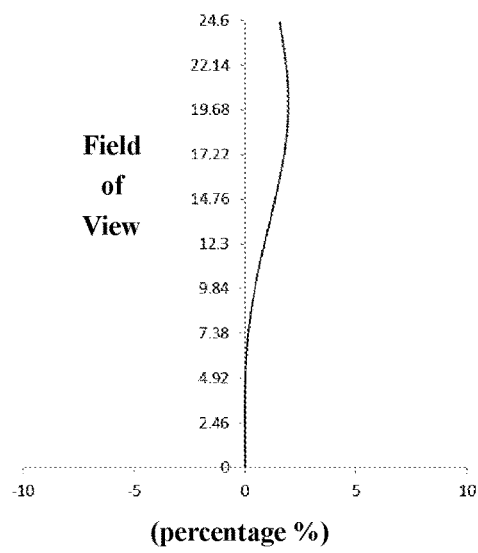
Figure 12D:
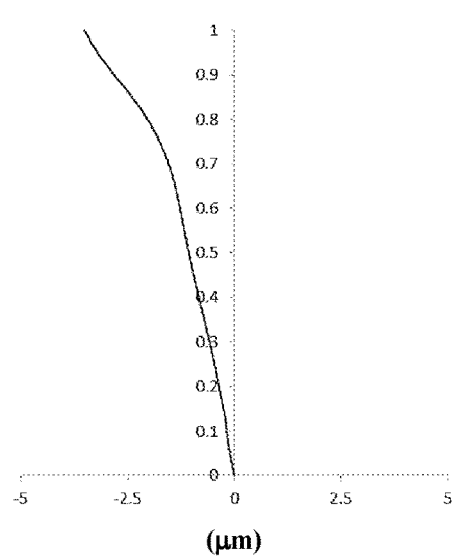

FIG. 12A shows a longitudinal aberration curve of the optical imaging lens according to Embodiment 6, which represents the deviation of the converged focal point after light of different wavelengths passes through the camera lens. FIG. 12B shows an astigmatism curve of the optical imaging lens according to Embodiment 6, which represents the curvature of the tangential image plane and the curvature of the sagittal image plane. FIG. 12C shows a distortion curve of the optical imaging lens according to Embodiment 6, which represents distortion magnitude values corresponding to different fields of view. FIG. 12D shows a lateral color curve of the optical imaging lens according to Embodiment 6, which represents the deviation of different image heights on the imaging plane after light passes through the camera lens. According to FIGS. 12A to 12D, it can be seen that the optical imaging lens given in Embodiment 6 can realize good quality of imaging.

In summary, Embodiments 1 to 6 satisfy the relationships shown in Table 13, respectively.

TABLE 13

| Conditional expression | Embodiment | | | | | |
|---|---|---|---|---|---|---|
| | 1 | 2 | 3 | 4 | 5 | 6 |
| TTL/EPD | 1.80 | 1.83 | 1.86 | 1.77 | 1.84 | 1.81 |
| f (mm) | 7.20 | 7.18 | 7.29 | 7.49 | 7.49 | 7.49 |
| (f1 + f2)/f6 | 1.24 | 1.16 | 0.77 | 0.53 | 0.57 | 1.86 |
| f3/f5 | 0.71 | 0.66 | 0.58 | 0.50 | 0.53 | 0.80 |
| R2/R1 | 4.56 | 4.56 | 4.51 | 4.57 | 4.41 | 4.70 |
| R6/R3 | 0.63 | 0.56 | 0.63 | 0.56 | 0.43 | 1.10 |
| f/EPD | 1.85 | 1.88 | 1.94 | 1.87 | 1.97 | 1.89 |
| TTL/f | 0.97 | 0.98 | 0.96 | 0.95 | 0.93 | 0.95 |
| FOV (°) | 50.8 | 50.8 | 50.5 | 49.6 | 41.2 | 49.0 |
| SL/TTL | 0.65 | 0.62 | 0.62 | 0.63 | 0.63 | 0.63 |
| f56/f34 | 2.92 | 3.12 | 2.66 | 2.88 | 3.73 | 3.48 |
| f12/(CT1 + CT2) | 2.00 | 1.94 | 1.93 | 1.93 | 1.94 | 2.10 |
| (SAG51 + SAG52)/(SAG61 + SAG62) | 1.24 | 2.22 | 1.24 | 1.20 | 1.01 | 1.54 |

The present application further provides an imaging apparatus, which is provided with an electronic photosensitive element for imaging. The electronic photosensitive element may be a charge-coupled device (CCD) or a complementary metal oxide semiconductor element (CMOS). The imaging apparatus may be an independent imaging apparatus such as a digital camera, or may be an imaging module integrated in a mobile electronic device such as a mobile phone. The imaging apparatus is equipped with the optical imaging lens described above.

The above description is only the preferred embodiments of the present application and the explanation of the applied technical principle. It should be understood by those skilled in the art that the scope of protection involved in the present application is not limited to technical solutions formed by specific combinations of the above technical features, and at the same time, should also cover other technical solutions formed by any combination of the above technical features or equivalent features thereof without departing from the concept of the present application. For example, the above features and (but not limited to) the technical features with similar functions disclosed in the present application are replaced with each other to form technical solutions.

What is claimed is:

1. An optical imaging lens, comprising, in order from an object side to an image side along an optical axis:
   a first lens having a positive refractive power;
   a second lens having a positive refractive power;
   a third lens having a negative refractive power;
   a fourth lens;
   a fifth lens having a negative refractive power; and
   a sixth lens having a positive refractive power,
   wherein a distance TTL from an object side surface of the first lens to an imaging plane of the optical imaging lens on the optical axis and an entrance pupil diameter EPD of the optical imaging lens satisfy TTL/EPD<1.9; and
   a total effective focal length f of the optical imaging lens satisfies 6.0 mm<f<7.5 mm;
   wherein a radius of curvature R2 of an image side surface of the first lens and a radius of curvature R1 of the object side surface of the first lens satisfy 4.3<R2/R1<4.8.

2. The optical imaging lens according to claim 1, wherein an effective focal length f1 of the first lens, an effective focal length f2 of the second lens, and an effective focal length f6 of the sixth lens satisfy 0.5<(f1+f2)/f6<1.9.

3. The optical imaging lens according to claim 1, wherein an effective focal length f3 of the third lens and an effective focal length f5 of the fifth lens satisfy 0.4<f3/f5<0.9.

4. The optical imaging lens according to claim 1, wherein a radius of curvature R6 of an image side surface of the third lens and a radius of curvature R3 of an object side surface of the second lens satisfy 0.4<R6/R3<1.2.

5. The optical imaging lens according to claim 1, wherein the total effective focal length f of the optical imaging lens and the entrance pupil diameter EPD of the optical imaging lens satisfy f/EPD<2.0.

6. The optical imaging lens according to claim 1, wherein the distance TTL from the object side surface of the first lens to the imaging plane of the optical imaging lens on the optical axis and the total effective focal length f of the optical imaging lens satisfy TTL/f<1.0.

7. The optical imaging lens according to claim 1, wherein the optical imaging lens further comprises a diaphragm on the optical axis; and
   a distance SL from the diaphragm to the imaging plane of the optical imaging lens on the optical axis and the distance TTL from the object side surface of the first lens to the imaging plane of the optical imaging lens on the optical axis satisfy 0.6<SL/TTL<0.7.

8. The optical imaging lens according to claim 1, wherein a combined focal length f56 of the fifth lens and the sixth lens and a combined focal length f34 of the third lens and the fourth lens satisfy 2.6<f56/f34<3.8.

9. The optical imaging lens according to claim 1, wherein an on-axis distance SAG51 between an intersection point of an object side surface of the fifth lens and the optical axis and an effective radius vertex of the object side surface of the fifth lens, an on-axis distance SAG52 between an intersection point of an image side surface of the fifth lens and the optical axis and an effective radius vertex of the image side surface of the fifth lens, an on-axis distance SAG61 between an intersection point of an object side surface of the sixth lens and the optical axis and an effective radius vertex of the object side surface of the sixth lens, and an on-axis distance SAG62 between an intersection point of an image side surface of the sixth lens and the optical axis and an effective radius vertex of the image side surface of the sixth lens satisfy 1.0<(SAG51+SAG52)/(SAG61+SAG62)<2.3.

10. An optical imaging lens, comprising, in order from an object side to an image side along an optical axis:
    a first lens having a positive refractive power;
    a second lens having a positive refractive power;
    a third lens having a negative refractive power;
    a fourth lens;
    a fifth lens having a negative refractive power; and
    a sixth lens having a positive refractive power,
    wherein a total effective focal length f of the optical imaging lens and an entrance pupil diameter EPD of the optical imaging lens satisfy f/EPD<2.0; and
    the total effective focal length f of the optical imaging lens satisfies 6.0 mm<f<7.5 mm;
    wherein a combined focal length f56 of the fifth lens and the sixth lens and a combined focal length f34 of the third lens and the fourth lens satisfy 2.6<f56/f34<3.8.

11. The optical imaging lens according to claim 10, wherein an effective focal length f1 of the first lens, an effective focal length f2 of the second lens, and an effective focal length f6 of the sixth lens satisfy 0.5<(f1+f2)/f6<1.9.

12. The optical imaging lens according to claim 10, wherein an effective focal length f3 of the third lens and an effective focal length f5 of the fifth lens satisfy 0.4<f3/f5<0.9.

13. The optical imaging lens according to claim 10, wherein a radius of curvature R2 of an image side surface of the first lens and a radius of curvature R1 of the object side surface of the first lens satisfy 4.3<R2/R1<4.8.

14. The optical imaging lens according to claim 10, wherein a radius of curvature R6 of an image side surface of the third lens and a radius of curvature R3 of an object side surface of the second lens satisfy 0.4<R6/R3<1.2.

15. The optical imaging lens according to claim 14, wherein a distance TTL from an object side surface of the first lens to an imaging plane of the optical imaging lens on the optical axis and the entrance pupil diameter EPD of the optical imaging lens satisfy TTL/EPD<1.9.

16. The optical imaging lens according to claim 10, wherein a distance TTL from an object side surface of the first lens to an imaging plane of the optical imaging lens on the optical axis and the total effective focal length f of the optical imaging lens satisfy TTL/f<1.0.

17. The optical imaging lens according to claim 10, wherein the optical imaging lens further comprises a diaphragm on the optical axis; and
a distance SL from the diaphragm to an imaging plane of the optical imaging lens on the optical axis and a distance TTL from an object side surface of the first lens to an imaging plane of the optical imaging lens on the optical axis satisfy 0.6<SL/TTL<0.7.

18. An optical imaging lens, comprising, in order from an object side to an image side along an optical axis:
a first lens having a positive refractive power;
a second lens having a positive refractive power;
a third lens having a negative refractive power;
a fourth lens;
a fifth lens having a negative refractive power; and
a sixth lens having a positive refractive power,
wherein a total effective focal length f of the optical imaging lens and an entrance pupil diameter EPD of the optical imaging lens satisfy f/EPD<2.0; and
the total effective focal length f of the optical imaging lens satisfies 6.0 mm<f<7.5 mm;
wherein an on-axis distance SAG51 between an intersection point of an object side surface of the fifth lens and the optical axis and an effective radius vertex of the object side surface of the fifth lens, an on-axis distance SAG52 between an intersection point of an image side surface of the fifth lens and the optical axis and an effective radius vertex of the image side surface of the fifth lens, an on-axis distance SAG61 between an intersection point of an object side surface of the sixth lens and the optical axis and an effective radius vertex of the object side surface of the sixth lens, and an on-axis distance SAG62 between an intersection point of an image side surface of the sixth lens and the optical axis and an effective radius vertex of the image side surface of the sixth lens satisfy 1.0<(SAG51+SAG52)/(SAG61+SAG62)<2.3.

* * * * *